(12) United States Patent
Weier et al.

(10) Patent No.: US 6,875,808 B2
(45) Date of Patent: *Apr. 5, 2005

(54) MULTIPLE POLYMERIC ADDITIVE SYSTEMS: COMPOSITIONS, PROCESSES, AND PRODUCTS THEREOF

(75) Inventors: Jane Elizabeth Weier, Hopewell, NJ (US); Chuen-Shyong Chou, Ambler, PA (US); Morris Christopher Wills, Phila., PA (US); Jiun-Chen Wu, West Windsor, NJ (US); Eugene Patrick Dougherty, Langhorne, PA (US)

(73) Assignee: Rohm and Haas Company, Philadelphia, PA (US)

( * ) Notice: Subject to any disclaimer, the term of this patent is extended or adjusted under 35 U.S.C. 154(b) by 444 days.

This patent is subject to a terminal disclaimer.

(21) Appl. No.: 09/943,690

(22) Filed: Aug. 31, 2001

(65) Prior Publication Data

US 2002/0045680 A1 Apr. 18, 2002

Related U.S. Application Data

(60) Provisional application No. 60/230,228, filed on Sep. 3, 2000.

(51) Int. Cl.$^7$ ............................ C08L 51/00; C08L 33/00
(52) U.S. Cl. ....................... 524/504; 524/819; 524/823; 523/201; 523/206; 525/71
(58) Field of Search ................................ 524/819, 823, 524/504; 523/201, 206; 525/71

(56) References Cited

U.S. PATENT DOCUMENTS

| | | | |
|---|---|---|---|
| 3,793,402 A | 2/1974 | Owens | 260/876 R |
| 3,864,432 A | 2/1975 | Adler et al. | 260/897 B |
| 3,971,835 A | 7/1976 | Myers et al. | 260/876 R |
| 4,040,996 A | 8/1977 | Van Vonno | 260/23 XA |
| 4,245,070 A * | 1/1981 | Kemp | 526/75 |
| 4,385,152 A | 5/1983 | Boyack et al. | 524/460 |
| 4,440,905 A | 4/1984 | Dunkelberger | 525/66 |
| 4,469,825 A | 9/1984 | Kowalski et al. | 523/201 |
| 4,539,361 A | 9/1985 | Siol et al. | 524/458 |
| 4,791,151 A | 12/1988 | Kowalski et al. | 523/201 |
| 5,094,998 A | 3/1992 | Hoshino et al. | |
| 5,276,092 A | 1/1994 | Kempner et al. | 525/84 |
| 5,534,594 A | 7/1996 | Troy et al. | 525/310 |
| 5,599,854 A | 2/1997 | Troy et al. | 523/201 |
| 5,726,259 A | 3/1998 | Hayes et al. | 526/80 |
| 5,998,543 A * | 12/1999 | Collins et al. | 524/808 |
| 6,130,288 A * | 10/2000 | Inoue et al. | 524/556 |
| 6,214,929 B1 | 4/2001 | Haremza et al. | |
| 6,245,848 B1 * | 6/2001 | Espiard et al. | 524/419 |
| 6,639,012 B2 | 10/2003 | Wills et al. | |

FOREIGN PATENT DOCUMENTS

| | | |
|---|---|---|
| AU | A-48232-96 | 3/1996 |
| DE | 197 26 802 | 6/1997 |
| DE | 197 41 778 | 3/1998 |
| EP | 0 025 561 | 3/1981 |
| EP | 0 343 833 | 5/1989 |
| EP | 0 439 427 | 1/1991 |
| EP | 0 536 935 | 9/1992 |
| EP | 0 810 241 | 12/1997 |
| EP | 0 814 103 | 12/1997 |
| EP | 0 826 702 | 3/1998 |
| EP | 0 942 037 | 3/1999 |
| EP | 1 033 390 | 9/2000 |
| FR | 2 309 569 | 11/1976 |
| WO | WO 94/06876 | 3/1994 |
| WO | WO 01/48026 | 7/2001 |

* cited by examiner

Primary Examiner—Tae H. Yoon
(74) Attorney, Agent, or Firm—Marcella M. Bodner; Jeffrey H. Rosedale

(57) ABSTRACT

The present invention provides multiple polymeric additive systems and processes for preparing multiple polymeric additive systems which contain a liquid component and a solid component, wherein the solid component contains two or more polymeric additive particles having different compositions. The present invention also provides polymeric compositions and processes for preparing polymeric compositions that include a polymeric component and a multiple polymeric additive system which contains a liquid component and a solid component, wherein the solid component contains two or more polymeric additive particles having different compositions. The disclosed compositions and processes are useful in the preparation of polymeric materials and articles produced therefrom.

8 Claims, No Drawings

MULTIPLE POLYMERIC ADDITIVE SYSTEMS: COMPOSITIONS, PROCESSES, AND PRODUCTS THEREOF

CROSS REFERENCE TO RELATED PATENT APPLICATIONS

This is a non-provisional application of prior pending U.S. provisional application Ser. No. 60/230,228, filed Sep. 3, 2000.

BACKGROUND OF THE INVENTION

This invention relates to compositions which are useful as multiple polymeric additive systems. This invention also relates to processes for making multiple polymeric additive systems. This invention further relates to polymeric compositions that include a polymeric component and a multiple polymeric additive system. This invention even further relates to processes for preparing polymeric compositions that include a polymeric component and a multiple polymeric additive system.

Numerous molded articles and films are manufactured from one or more of a variety of polymeric resins. Often times, these resins, by themselves, do not possess all of the properties required by the end use for which they are made. To overcome their shortcomings, these resins are generally blended with other components which exhibit the desired properties. Such components are typically known in the industry as "polymeric additives". There are many varieties of polymeric additives known, and each of these are available in a variety of physical forms (e.g., gas, liquid, solid, and combinations thereof) and chemical forms (e.g., organic, inorganic, metallic, non-metallic, polymeric, non-metallic, and combinations thereof).

Although polymeric additives can be made by a number of different ways, many are made by emulsion polymerization. Thereafter, the emulsion is dried to form a powder. The powder is then blended with the polymeric resin system whose properties need to be enhanced.

Accordingly, since many polymeric additives are blended with the polymeric resin when the additive is in a powder form, one significant limitation upon the development and/or selection of new polymeric additives is their ability to form a stable powder. The term "stable" as it pertains to powders means, among other things, the ability of the particles making up the powder to remain in a flowable form during normal storage, handling and processing procedures. One reason for the existence of this problem is that many polymeric additives are relatively soft. Accordingly, they often have the tendency to stick together; thus, reducing the additive's stability. This phenomenon is often seen in polymeric additives designed to enhance the impact modification of the polymeric resin system since, in order to impart this property, the additive generally needs to be soft and/or rubbery.

One means of addressing this problem has been to use multi-layered multiple polymeric additive systems. Such systems are typically known in the industry as a "core/shell" system. In most core/shell systems, the inner stage (i.e., the core) is relatively soft and/or rubbery; and the outer-stage (i.e., the shell) is relatively hard. The hardness of the outer shell keeps the particles from sticking together.

Polymer additives have also been developed for the purpose of modifying the processing characteristics of plastics resins. These "processing aids" are generally high in molecular weight, typically above 1 million g/mol, and are compatible with the plastic resin. However, dried processing aid powders are typically dusty and thereby difficult to handle.

It is therefore desirable to combine compositionally different polymeric additive particles to provide two or more functions, such as a combination of impact modifiers and processing aids. One way of combining an impact modifier polymeric additive particle with a processing aid polymeric additive particle is disclosed in U.S. Pat. No. 5,276,092. This Patent discloses core/shell impact modifier having an emulsion solids fraction less than 40% and processing aid additives which are prepared separately at small particle sizes by emulsion polymerization, co-agglomerated, further encapsulated by a final shell, and preferably isolated to a dry powder by spray-drying or coagulation.

While the use of co-agglomeration and an encapsulating shell polymer has been used to provide emulsion blends of two compositionally different polymeric additive particles, such aqueous systems are still fraught with other problems. For example, these aqueous systems are limited to low (less than 40%) solids weight fractions having more than 60% by weight water. Ordinarily, this water needs to be removed so that the process of preparing blends of resins and such aqueous dispersions is inefficient in requiring the removal of such large quantities of water.

Often times, the isolation of polymeric additive particles as dried powders will vary depending on the physically and chemical composition of the particle. Accordingly, co-isolating two or more different additive particles is at best complicated. For example, the problems seen during the co-isolation of impact modifiers and processing aids typically result in dispersion problems of the additives into the resins because one of the additive particles may have a greater affinity for the liquid phase, or be a lot more or a lot less stable as a colloid in the liquid phase, and therefore the distribution of polymeric additive particles in such a co-isolated powder will vary. For example, it is typical that during co-isolation, one population of particles will isolate separately from the other population. Accordingly, avoiding the need to co-isolate multiple polymeric additive particles is desirable in avoiding these problems.

Notwithstanding the aforementioned problems associated with powdery plastic additive systems, they are still the additive system of choice. However, the industry continues to look for alternatives to such systems. One of the alternatives that has been suggested is disclosed in U.S. Pat. No. 3,864,432. The multiple polymeric additive system disclosed in this Patent is not in a powder form, yet it is used to improve the impact strength of PVC resins. U.S. Pat. No. 5,276,092 also discloses that the emulsion product of encapsulated, co-agglomerated core/shell impact modifier and processing aid additives are preferably isolated to a dry powder by spray-drying or coagulation, but may be used still in an emulsion form.

While such a system can be used, there are many advantages associated with using higher solids systems that provide either improved property enhancements and/or two or more property enhancements. For example, some of the advantages of using higher solids systems that provide improved property enhancements include combining polymeric additives wherein at least one of the additives is not readily isolatable as a powder. Specifically, in the area of impact modification, it is desirable to add rubbery materials to brittle plastics in order to increase their ability to absorb impact stress. Although typical impact modifiers are in the form of core/shell polymer particle powders, it is desirable to further incorporate other rubbery materials which often are not readily available in a powder form. One example of a rubbery material which is not readily isolatable as a powder, includes solution-polymerized rubbery polymers such as solution-made styrene/diene block copolymers. Other rubbery materials which are desirable for incorporation into multiple polymeric additive systems include rubbery emulsion polymer particles which are not readily isolatable in a powdery form. Yet other rubbery materials which are desirably incorporated into impact modifying polymeric additive compositions include liquid polymers which are not readily isolatable as a powder. Examples of such liquid polymer include a polymeric oil, such as: low molecular weight polybutene, polysiloxane, certain mineral oils, liquid polysulfide, and the like.

For example, some of the advantages of using higher solids systems that two or more property enhancements include combining polymeric additives wherein at least one of the polymeric additives is an impact modifier and the other polymeric additive is a processing aid.

Many plastics additives which are not necessarily polymeric are also commonly used in the plastics industry to modify the processability and/or properties of polymeric resins. Examples of these other additives include: waxes; pigments; opacifiers; fillers; exfoliated clays; toners; antistatic agents; metals; flame retardants; thermal stabilizers; antioxidants; cellulosic materials; internal lubricants; external lubricants; oils; rheology modifiers; powder flow aids; dispersing aids; UV stabilizers; plasticizers; fillers; optical modifiers; surface roughness modifiers; surface chemistry modifiers; adhesion modifiers; surface hardeners; compatibilizers; diffusion barrier modifiers; stiffeners; flexibilizers; mold release agents; processing modifiers; blowing agents; thermal insulators; thermal conductors; electronic insulators; electronic conductors; biodegradation agents; antistatic agents; internal release agents; coupling agents; flame retardants; smoke-suppressers; colorants, and the like, and/or combinations thereof.

As seen by the examples set out above, many plastics additives come in a variety of physical forms such as volatile liquids, pasty waxes, dusty powders, hard solids, and the like. Accordingly, they are often handled separately when formulating a polymeric composition containing these additives. This creates obvious problems, especially when some of the additives come in a liquid form, while others that are needed come in a powder form. Other inherent problems with the conventional ways of enhancing the properties of a polymeric composition through the use of a polymeric additives include: handling dusty powders which requires special handling to avoid breathing of powders, explosion hazards arising from static electricity build-up, contamination, general difficulty in handling and containing dusty materials; handling pellets requires separate operational processes than that of powders making processes more complex and/or expensive requiring further equipment; minor ingredients (such as low solid fraction) are difficult to handle and evenly disperse in polymeric resins using conventional processes.

Notwithstanding the problems associated with conventional multiple polymeric additive systems, they will almost always be necessary due to the inherent deficiencies of polymeric compositions. However, the industry is continually searching for improved multiple polymeric additive systems which resolve at least some of the aforementioned problems.

SUMMARY OF THE INVENTION

Accordingly, one object of the present invention is to provide multiple polymeric additive systems which contain a liquid component and a solids component, wherein the solids component contains two or more populations of compositionally different polymer particles, and wherein the solids component is present in an amount of more than 40 weight percent, said weight percentage being based on the total weight of the multiple polymeric additive system.

Another object of the present invention is to provide processes for making multiple polymeric additive systems which contain a liquid component and a solids component, wherein the solids component contains two or more populations of compositionally different polymer particles, and wherein the solids component is present in an amount of more than 40 weight percent, said weight percentage being based on the total weight of the multiple polymeric additive system.

Yet another object of the present invention is to provide polymeric compositions that include a polymeric component and a multiple polymeric additive system which contains a liquid component and a solids component, wherein the solids component contains two or more populations of compositionally different polymer particles, and wherein the solids component is present in an amount of more than 40 weight percent, said weight percentage being based on the total weight of the multiple polymeric additive system.

Still another object of the present invention is to provide processes for preparing polymeric compositions that include a polymeric component and a multiple polymeric additive system which contains a liquid component and a solids component, wherein the solids component contains two or more populations of compositionally different polymer particles, and wherein the solids component is present in an amount of more than 40 weight percent, said weight percentage being based on the total weight of the multiple polymeric additive system.

These and other objects, as will become apparent from the following disclosure, are achieved by the various embodiments of the present invention set out below.

In one embodiment of the present invention, there is provided a novel multiple polymeric additive system which includes a liquid component and a solids component. In this embodiment, the solids component includes at least two different populations of polymeric additive particles. These particles differ with regard to at least their chemical composition, and can further differ with regard to at least one of the following: the property which they will impart to a polymeric composition into which they can be added, their size, their physical state, and/or their shape. Also in this novel multiple polymeric additive system, the solids component is present in an amount which is greater than 40 weight percent, wherein the weight percentage is based on the total weight of the multiple polymeric additive system.

In another embodiment of the present invention, there is provided a novel polymeric composition which includes a polymeric component and a polymeric additive component. In this embodiment, the novel polymeric composition is prepared by a process which includes the step of forming a blend of at least the polymeric component and a multiple polymeric additive system. In this embodiment, the multiple polymeric additive system includes a liquid component, and a solids component. The additive system's solids component, in turn, includes at least two different populations of polymeric additive particles. These polymeric additive particles differ with regard to at least their chemical composition, and can further differ with regard to at least one of the following: the property which they will impart to a polymeric composition into which they can be added, their size, their physical state, and/or their shape.

In yet another embodiment of the present invention, there is provided a novel process for making a multiple polymeric additive system which has a liquid component and a solids component, the solids component including polymeric additive particles. The process encompassed by this embodiment includes at least the following steps. First, an aqueous emulsion polymerization reaction mixture is provided which includes a first and second population the polymeric additive particles. Then, a first group of one or more ethylenically unsaturated monomers is polymerized in the aqueous emulsion so that at least one of said populations of polymeric additive particles increases in mean particle diameter. In this embodiment, after a portion of the first group of one or more ethylenically unsaturated monomers is polymerized, the chemical compositions of the first and second populations of polymeric additive particles are different. Also, the solids component is present in an amount which is greater than 40 weight percent, wherein the weight percentage is based on the total weight of the multiple polymeric additive system.

In still another embodiment of the present invention, there is provided a novel process for making a multiple polymeric additive system having a liquid component and a solids component. The process encompassed by this embodiment includes at least the following steps. First, an aqueous emulsion polymerization reaction mixture is provided which includes a first population and second population of polymer particles. Then, a first group of one or more ethylenically unsaturated monomers is polymerized in the aqueous emulsion such that at least a third population of polymeric additive particles is formed. In this embodiment of the present invention, after a portion of the first group of one or more ethylenically unsaturated monomers is polymerized, the chemical compositions of at least two of the populations of polymeric additive particles are different.

In a further embodiment of the present invention, there is provided a novel process for making a polymeric composition, wherein the polymeric composition includes a polymeric component and multiple polymeric additive system, and wherein the multiple polymeric additive system includes a liquid component and a solids component having at least two different populations of particles. In this embodiment, the chemical compositions of the first and second populations of polymeric additive particles are different. Also, the solids component is present in an amount which is greater than 40 weight percent, wherein the weight percentage is based on the total weight of the multiple polymeric additive system. In this embodiment, the polymeric component is first blended with the multiple polymeric additive system to form a mixture. Then, in a subsequent step, at least a portion of the multiple polymeric additive system's liquid component is at least partially removed from the mixture.

While the invention disclosed herein is susceptible to various modifications and alternative forms, specific embodiments thereof are herein described in detail. It should, however, be understood that the description herein of specific embodiments is not intended to limit the invention to the particular forms disclosed. On the contrary, as will be apparent to those skilled in the art after reading this specification, the invention covers all modifications, equivalents and alternatives falling within the spirit and scope of the appended claims.

DETAILED DESCRIPTION OF THE INVENTION

The term "polymer" used herein denotes a molecule having two or more units derived from the same monomer component, so that "polymer" incorporates molecules derived from different monomer components to for form copolymers, terpolymers, multi-component polymers, graft-co-polymers, block-co-polymers, and the like.

The term "rubbery" used herein denotes the thermodynamic state of a polymer above its glass transition temperature.

The term "units derived from" used herein refers to polymer molecules that are synthesized according to known polymerization techniques wherein a polymer contains "units derived from" its constituent monomers.

The term "molecular weight" used herein refers to the weight average molecular weight of polymer molecules as determined by the gel permeation chromatography method.

The term "graftlinker" used herein refers to multi-functional monomers capable of forming multiple covalent bonds between polymer molecules of one type with polymer molecules of another type.

The term "crosslinker" used herein refers to multi-functional monomers capable of forming two or more covalent bonds between polymer molecules of the same type.

The term "alkyl (meth)acrylate" used herein refers to both alkyl acrylate and alkyl methacrylate monomer compounds.

The term "stage" used herein is intended to encompass its broadest possible meaning, including the meaning conveyed in prior art such as in U.S. Pat. Nos. 3,793,402; 3,971,835; 5,534,594; and 5,599,854; which offer various means for achieving "staged" polymers.

The term "parts" used herein is intended to mean "parts by weight". Unless otherwise stated, "total parts by weight" do not necessarily add to 100.

The term "weight percent" used herein is intended to mean "parts per hundred by weight" wherein the total parts add to 100.

The term "multiple polymeric" used herein refers to a composition having two or more polymeric components.

All ranges defined herein are inclusive and combinable.

As will be set out below, the embodiments of this invention pertain to various aspects of a plastic additive system that includes a liquid and solids component, methods of making such additive systems, plastic compositions that include such systems, and/or methods of making such plastic compositions.

Among other things, this invention resolves at least some of the problems associated with the use of powdery plastic additive systems while improving a plastic resin's properties and or processing thereof. This invention also resolves at least some of the problems associated with the use of powdery plastic additive systems while providing two or more functional improvements to a plastic resin's properties and or processing thereof. This is accomplished by the development of novel plastic additive systems that include a liquid component and a solids component including at least two polymeric additive particle populations. Accordingly, when practicing this invention, the multiple polymeric additive systems' liquid concentration is typically greater than 1 weight percent; more typically greater than 10 weight percent; and even more typically, greater than 35 weight percent. These weight percentages are based on the total weight of the multiple polymeric additive system.

In one specific embodiment of the present invention, there is provided a novel multiple polymeric additive system which includes a liquid component and a solids component. In this embodiment, the solids component is present in an amount which is greater than 40 weight percent, wherein the weight percentage is based on the total weight of the multiple polymeric additive system. Also in this novel multiple polymeric additive system, the solids component includes at least two different populations of polymeric additive particles. Various polymeric additives include impact modifiers, processing aids, lubricating processing aids, powder flow aids, dispersing aids, rheology modifiers, matting agents, gloss improvers, antistatic agents, flame retardants, coupling agents, thermoset resins, pigment dispersant, filler dispersants, clay dispersants, wetting agents for compatibilizing glass fibers with polymeric resins, and the like.

Polymeric impact modifiers are typically provided by the following types of compositions: all polymeric rubbery materials such as those derived from acrylics, methylmethacrylate-butadiene-styrene ("MBS") type impact modifiers; silicon-containing rubber polymers and copolymers such as siloxanes, silicones, and the like; polymers containing flexible chains for reducing glass transition temperature, such as polyesters; chlorinated polyethylene ("CPE"); ethylene-vinylacetate polymers ("EVA"); acrylonitrile-butadiene-styrene ("ABS") polymers; carboxy-terminated butadiene-nitrile ("CTBN") polymers; ethylene-propylene-diene monomer ("EPDM") polymers; polyolefins; vinylaromatic-diene block copolymers; synthetic rubber, such as butadiene rubber, styrene-butadiene rubber ("SBR"), and isoprene, and the like; polyurethanes; rubbery polyethers such as an ethylene glycol and propylene-glycol based polymers, and the like; as well as blends, grafts, and copolymers thereof.

Impact modifiers are typically present in polymer resins at a weight percentage in the range of from 0.5 to 50 weight percent, more typically in the range of from 1 to 30 weight percent, and most typically in the range of from 2 to 20 weight. Engineering resins typically have about 10 to 20 weight percent impact modifiers; polyvinyl chloride ("PVC") typically has about 2 to 15 weigh percent; thermoplastic elastomers typically have 20 to 50 weight percentage of impact modifiers.

Polymeric processing aids are typically provided by the following types of compositions: polyesters, (meth)acrylic ester-containing polymers, styrenics, SAN, PVA, EVA-type, vinyl halogen polymers such as PVDF, fluorinated polymers such as PTFE, CTFE, PVC-acrylic copolymers, polyethers, polyolefin-polystyrene copolymers, acrylic-modified polyolefins, (meth)acrylic acid-containing polymers, and blends, grafts, and copolymers thereof.

Processing aids are typically present in polymer resins at a weight ratio of from 0.1 weight percent to 20 weight percent. More typically from 0.25 weight percent to 15 weight percent. Most typically from 0.5 weight percent to 8 weight percent, the weight percentage being based on the weight of the polymeric component.

Polymeric lubricating processing aids as known in the art provide a lubricating effect and a melt processing effect when added to polymeric melt components. Typical lubricating processing aids can be provided by compositions provided for by processing aids wherein a lubricating component is added, as known in the art.

Lubricating processing aids are typically present in polymer resins at a weight ratio of from 0.05 weight percent to 10 weight percent. More typically from 0.1 weight percent to 7 weight percent. Most typically from 0.2 weight percent to 5 weight percent, the weight percentage being based on the weight of the polymeric component.

Polymeric powder flow aids are typically provided by the following types of compositions: silicon-based polymers; fumed silicon; hard organic polymers, such as those having a Tg greater than about 60° C., acrylics, styrenics, polymeric-coated particles such as polystearic acid-coated calcium carbonate, and the like.

Powder flow aids are typically formulated in polymer resin powders and polymer dispersions. Powder flow aids are typically present at a weight ratio of from 0.05 weight percent to 10 weight percent. More typically from 0.1 weight percent to 7 weight percent. Most typically from 0.2 weight percent to 5 weight percent, the weight percentage being based on the weight of the polymeric component.

Compositions of polymeric dispersion aids, which are typically known in the art as "Dunkelspersers", are disclosed in U.S. Pat. No. 4,440,905, the portion of which relates to the composition and use of polymeric dispersion aids is incorporated by reference herein.

Polymeric melt rheology modifiers are typically provided by the following types of compositions: olefin-polar polar graft copolymers such as olefin-acrylic graft copolymers, olefin-styrene graft copolymers, and the like; oxidized polyolefins; EVA; long-chain alkyl (meth)acrylates, and the like as known in the art; as well as grafts, and blends, and copolymers thereof.

Polymeric melt rheology modifiers are typically present in polymer resins at a weight ratio of from 0.05 weight percent to 10 weight percent. More typically from 0.1 weight percent to 7 weight percent. Most typically from 0.2 weight percent to 5 weight percent, the weight percentage being based on the weight of the polymeric component.

In one specific embodiment of the present invention, the multiple polymeric additive system's solid component contains two or more of the polymeric additives previously described. The weight ratios of such two or more polymeric additives in the multiple polymeric additive system is determined by combining the weight percentage ranges that each polymeric additive is used in modifying a polymeric resin. Thus, in a specific example, the weight ratio of impact modifier polymer particles to processing aid polymer particles in the solids component of a multiple polymeric additive system will range from 0.5:20 to 50:0.1. Examples of other weight ratios of two or more polymeric additive particles can be determined by the weight percentages provided above.

Any suitable means can be used to produce a plastic additive system having, among other things, a solid component greater than 40 weight percent. One example of such a suitable means is to blend two or more populations of polymeric additive particles, each population having an excess of 40 weight percent polymer particles. Another example of such a suitable means is to blend two or more populations of polymeric additive particles, one population having an excess of 40 weight percent polymer particles and the other population having less than 40 weight percent polymer particles so that the combination has an excess of 40 weight percent polymer particles. Another example of such a suitable means is to employ as part of the solid component at least two differently-sized populations of particles.

Although one specific embodiment of the invention requires that the particle size of the at least two populations of particles merely be different, it has been observed that higher solids concentrations can be achieved when the particle size of the first population of particles is at least 50% larger than that of the second population of particles. In instances where even higher solids concentration are desirable, the particle size of the first population of particles is at least 100% larger than that of the second; more typically at least 200% larger than that of the second population; and even more typically at least 250% larger than that of the second population.

However, it has also been observed that having the particle size difference too great can cause some problems. Accordingly, when practicing this embodiment of the invention, the particle size of the first population of particles is typically not greater than 10,000% larger than that of the second population of particles; more typically not greater than 1,000% larger than that of the second population; and even more typically not greater than 300% larger than that of the second population. These size differences are particularly preferred for preparing polymeric additive particles which are useful as impact modifiers. For the purposes of creating a multiple polymeric additive system that flows well, in one preferred embodiment the particle size difference is in the range of from 700% to 1,000%.

When the multiple polymeric additive system is essentially the reaction product of an emulsion polymerization reaction containing two or more populations of polymer particles, the limit on solids weight fraction is theoretically limited. When looking at a combination of two polymer populations which vary in particle size, there are three main variables: weight percent of large population "mode", particle size of the large mode and particle size of small mode. Diameter Ratio (DR) is equal to the diameter of the large mode (Dlarge) divided by the diameter of the smaller mode (Dsmall). From a theoretical standpoint the optimum value of DR for maximizing packing density ranges from about 7 to about 10.

In comparison to randomly packed ideal single mode spheres which has a packing factor of 0.639, a combination of large mode and small mode spheres having a DR of 10 provides a packing factor of 0.835, while a DR of infinity will give 0.870. Hence, any further increase in the DR above about 10 gives a marginal increase in packing density.

To achieve the maximum packing factor for a combination of large mode and small mode polymer particles, the weight percent of the large polymer particles should be about 73.5%. While this value is for an ideal system for merely maximizing the packing effects, the weight percent of the large polymer particles may vary depending on properties sought by the polymer particles. For example, impact modifiers tend to provide better impact strength to polymeric resins as the particle size decreases, thus the weight percent of large impact modifier polymer particles may be best less than 73.5%.

In addition, a combination of three or more populations of polymer particles "multi-populations" which varying in particle size can provide further increases in the packing fraction beyond the theoretical value of 87% for two populations of polymer particles. Further increases are expected in "multi-populations" of polymer particles as the interstitial spaces in the two-population system can be further filled by even smaller particles.

From a practical standpoint involving emulsion-polymerized polymeric additive particles, the optimum particle size distribution is typically determined by the latex properties desired. However, these properties vary depending on the application. While having a large Diameter Ratio might be ideal for maximizing the packing fraction, a large DR does not necessarily provide ideal application properties.

In the embodiment of this invention wherein the multiple polymeric additive system's solid component has at least two differently-sized populations of particles, the larger-sized population typically has a mean particle diameter in the range from about 10 nm to about 50,000 nm. More typically, the larger-sized population has a mean particle diameter in the range from about 50 nm to about 1,500 nm; even more preferably from about 100 nm to about 1,000 nm; and even more preferably from about 300 nm to about 600 nm.

For providing additives useful as impact modifiers, it is desirable that the mean particle diameter of the smaller population has a particle size of about 100 to 150 nm. Maximizing the weight fraction of the smaller population is desirable for improving impact strength. Often, the mean particle diameter of impact modifier particles of the small mode is most desirably in the range of from about 100 to 120 nm, especially where the particle solids concentration about 50%. At higher weight percent solids of about 65%, it is desirable that the mean particle diameter of the smaller population is in the range of about 225 to 275 nm. Accordingly, the larger population at about 50% solids is most desirably in the range of about 300 nm to 350 nm. At concentrations of about 65%, the mean part diameter of the larger pop is most preferably in the range of from 500 to 600 nm.

Impact modifier polymeric additive particles typically have greater than 50% of a rubbery component, more typically greater than 70% of a rubbery component, and most typically greater than 80% of a rubbery component. For maximizing impact efficiency it is desirable that the rubbery component approaches 100 weight percentage of the polymer particle.

In one embodiment of the present invention, the multiple polymeric additive system contains polymeric additive particles which may be selected from the following group: impact modifiers; plasticizers; processing aids; reinforcers; heat distortion improvers; lubricating processing aids; optical modifiers; hollow spheres; surface modifiers; and combinations thereof Other polymeric additive particles include those which are useful for modifying surface properties. Polymeric additive particles may also be used to: improve melt flow (index) or melt strength; improve flame retardancy; improve thermal stability properties; and to reduce plate-out in extruders. Moreover, such particles may also be used to reduce "sagging" that often takes place during or after thermoforming of polymeric materials.

In another embodiment, the solid component of the multiple polymeric additive system contains polymeric additive particles which are useful as processing aids. Typically, processing aids have polymer compositions exhibiting a glass transition ("Tg") higher than about 25° C. Typically, processing aids have polymer compositions with molecular weights ("MW") greater than about 1 million g/mol. More typically, processing aids have molecular weights greater than about 3 million g/mol. In certain applications, such as preparing PVC foam, processing aids may have molecular weights greater than about 6 million.

As used herein, the term "compositionally" refers to the particles' chemical composition. The particles can have any suitable chemical composition as long as the compositions of the first and second populations are essentially different. Typically, the particles have a chemical composition that, in some way, enhances at least one physical property of the polymeric composition into which it will be added. The particle's chemical composition can, however, be that of an inert filler.

Examples of a particle's chemical composition may include: waxes; pigments; opacifiers; exfoliated clays; toners; antistatic agents; metals; flame retardants; thermal stabilizers; co-stabilizers; antioxidants; cellulosic materials; impact modifiers; processing aids; lubricating processing aids; internal lubricants; external lubricants; oils; rheology modifiers; powder flow aids; melt-flow aids; dispersing aids; UV stabilizers; plasticizers; fillers; optical modifiers; surface roughness modifiers; surface chemistry modifiers; adhesion modifiers; surface hardeners; compatibilizers; diffusion barrier modifiers; stiffeners; flexibilizers; mold release agents; processing modifiers; blowing agents; thermal insulators; thermal conductors; electronic insulators; electronic conductors; biodegradation agents; antistatic agents; internal release agents; coupling agents; flame retardants; smoke-suppressers; anti-drip agents; colorants; and the like.

The particles' preferred chemical composition will depend, in part, on the desired end use of the plastic additive system and/or the polymeric composition into which they are to be added. Those skilled in the art would be able to readily determine the particles' chemical composition which best suits their needs after reading this specification.

Also as used herein, the term "dimensionally" refers to the particles' size and/or shape. With regard to their shape, the particles making-up the additive systems' solid component are typically spherically-shaped. However, they can have any suitable shape. Various shapes of polymer particles can be prepared by processes known in the art of polymer particle technology. Examples of such suitable shapes of particles include: rubbery core/hard shell inhomogeneous particles, hard shell/rubbery core particles, particles having more complex (e.g. three-stage, hard/soft/hard; four-stage soft/hard/soft/hard, etc.) morphologies; ellipsoidal particles having an aspect ratio greater than 1:1; raspberry-shaped particles; multi-lobe-shaped particles; dumbbell-shaped particles; agglomerated particles; bilobal particles; hollow sphere particles; and the like.

With regard to their size, this typically refers to their mean particle size. Accordingly, in the case where the particles are spherically-shaped, this refers to their mean particle diameter.

The particles' preferred dimension will depend, in part, on the desired end use of the plastic additive system and/or the polymeric composition into which they are to be added. Those skilled in the art would be able to readily determine the particles' dimension which best suits their needs after reading this specification.

It is within the purview of this invention for the first and second populations of polymer particles to be at least compositionally different from one another. However, it is within the purview of this invention that the first and second populations of polymer particles are, in all other aspects, identical to each other, or completely different to each other, or anything in between. The particles' preferred dimensional and chemical configuration will depend, in part, on the desired end use of the plastic additive system and/or the polymeric composition into which they are to be added. Those skilled in the art would be able to readily determine the configuration which best suits their needs after reading this specification.

As stated above, the embodiments of this invention resolve at least some of the problems associated with the use of powdery plastic additive systems by the development of novel plastic additive systems that include a liquid component. In the multiple polymeric additive system of the present invention the liquid component can include any suitable liquids.

Typically, the additive's liquid component contains at least some water. The liquid component of the multiple polymeric additive systems of the present invention may contain water. Although water may be absent from the liquid component, typically the liquid component will contain at least 10 weight percent water, more typically at least 50 weight percent water, and most typically at least 80 weight percent water. Even more typical, the liquid is essentially 100% weight percent water, said weight percentage being based on the total weight of the multiple polymeric additive system's liquid component. However, it is within the purview of this invention for the additive's liquid component to contain essentially no water.

The specific selection of liquids that make-up the additive's liquid component depends, in part, on the additive's desired end use and/or preparation. Examples of liquids that can be used to make up at least part of the additives' liquid component include at least one of the following: water, organic solvents, alcohols, esters, plasticizers, emulsion stabilizers, defoamers, leveling agents, biocides, mildewicides, fungicides, UV stabilizers, lubricants, oils, dyes, rheology modifiers, thermal stabilizers, co-stabilizers, antioxidants, mold release agents, oligomers, monomers, crosslinkers, graftlinkers, curing agents, reactants, and the like. Moreover, the additives' liquid component can also include liquid polymeric additives designed to enhance at least some of the properties of the polymeric composition into which they will be added. Examples of such liquid polymeric additives include: oligomers, low molecular weight polymers, rubbers, uncured coating components, uncured polymeric components, e.g., thermoset components, and the like. Most typically, where the liquid component contains essentially no water, the liquid component may include oils, oligomers, stabilizers, monomers, lubricants, combinations thereof, and the like.

It is within the purview of this invention for the additive's liquid component to be made up of only one liquid, or a number of different liquids. The preferred composition of the additive's liquid component will depend, in part, on the desired end use of the plastic additive system and/or the polymeric composition into which they are to be added. Those skilled in the art would be able to readily determine the composition of the additive's liquid component which best suits their needs after reading this specification.

Other additives available in a liquid form include monomers, oligomers, and liquid rubbers. Particularly useful combinations of liquids include but are not limited to: stabilizers plus lubricants; water, emulsifiers and antioxidants; water, emulsifiers, oils or other non-water soluble ingredients, e.g. oil in water emulsions or dispersions). These combinations are useful for the purposes of uniform incorporation and dispersion of active stabilizing ingredients or non-water soluble additives. Various other useful combinations of liquid additives can be readily prepared by those skilled in the art.

In one embodiment of the multiple polymeric additive system of the present invention the liquid component may contain essentially no water. In this case, the liquid component may be any of the above named liquids, e.g. especially oils, oligomers, stabilizers, monomers, lubricant. In this case the absence of water can be provided by drying the polymer particles according to the emulsion polymerization processes described earlier. Suitable drying steps include, for example, spray drying, coagulation, freeze drying). Multiple polymeric additive systems containing essentially no water are then provided by mixing the dry polymer particles with a liquid.

In one embodiment for preparing a multiple polymeric additive system, the first population of polymer additive particles of the solid component are compositionally different from the second population of polymeric additive particles. Compositionally different populations of polymer particles can be provided by the following procedures: post-blending of two compositionally distinct lattices or solutions, in-situ formation and polymerization of a second particle population in the presence of a previously polymerized particle population. In another example, two seeds having similar swelling characteristics and different polymerization characteristic can also be provided for preparing compositionally different polymeric additive particles.

For example, when the reactivity ratios of two or more monomers are quite different, then copolymerizing a mixture of these two or more monomers would essentially result in separate populations of polymer particles, each population being derived substantially from each monomer. It is believed that this mechanism is driven by monomer/seed thermodynamics wherein the monomers partition among the seed particles.

Two different populations of particles which are compositionally different can also be prepared wherein the kinetics of polymerization vary among the two monomers. One specific example is where butadiene ("BD") monomer, which polymerizes via free radical polymerization much more slowly than methyl methacrylate monomer ("MMA"). In this example, providing a BD/MMA mixture to would result in the formation of MMA-derived polymer seed particles first; subsequently adding excess soap results in the formation of BD-derived polymer seed particles. Overall, balancing thermodynamics and the kinetics will generally provide a range of different polymer particle populations using the methods described herein.

In one specific embodiment of the present invention, there is provided a novel multiple polymeric additive system which includes a liquid component and a solids component, wherein the solids component includes at least two populations of compositionally different polymeric additive particles, and wherein the solids component is present in an amount greater than 40 weight percent. Although this embodiment of the invention requires that the additive system's solids component be merely greater than 40 weight percent, it has been observed that even higher solids concentrations have certain advantages associated therewith. Accordingly, when practicing this embodiment of the invention, the additive system's solids component is typically greater than 45 weight percent; more typically greater than 50 weight percent; and even more typically, greater than 55 weight percent.

Any suitable means can be used to produce a plastic additive system having, among other things, a solids component greater than 40 weight percent. One example of such a suitable means is to employ as part of the solids component at least two differently-sized populations of particles.

The multiple polymeric additive systems of the present invention can be in any suitable form, including powders, pellets, and tablets containing the liquid component. Typically, the multiple polymeric additive system is in one of the following forms: an emulsion, a latex, a suspension, a slurry, a dispersion, a wet-cake, a paste, and the like.

The preferred form of the plastic additive systems encompassed by this invention will depend, in part, on the desired end use of the plastic additive system and/or the polymeric composition into which they are to be added. Those skilled in the art would be able to readily determine the form which best suits their needs after reading this specification.

In the embodiment wherein the plastic additive system is in an emulsion form, the additive's liquid component is generally present in an amount of at least about 1 weight percent. Typically, when in this form, the additive's liquid component is present in an amount of at least about 5 weight percent; more typically of at least about 10 weight percent; and even more typically in an amount of at least about 20 weight percent. On the other hand, when in the emulsion form, the additive's liquid component is generally present in an amount of not greater than about 60 weight percent. Typically, when in this form, the additive's liquid component is present in an amount of not greater than about 50 weight percent; more typically of not greater than about 40 weight percent; and even more typically in an amount of not greater than about 30 weight percent. All of the aforementioned weight percentages are based on the total weight of the plastic additive system.

The ranges for the liquid component weight fraction in the multiple polymeric additive system for a latex, a suspension, a slurry, or a dispersion form is substantially the same as that for an emulsion form.

In the embodiment wherein the plastic additive system is in a wet-cake form, the additive's liquid component is generally present in an amount of at least about 1 weight percent. Typically, when in this form, the additive's liquid component is present in an amount of at least about 5 weight percent; more typically of at least about 10 weight percent; and even more typically in an amount of at least about 20 weight percent. On the other hand, when in the wet-cake form, the additive's liquid component is generally present in an amount of not greater than about 60 weight percent. Typically, when in this form, the additive's liquid component is present in an amount of not greater than about 50 weight percent; more typically of not greater than about 40 weight percent; and even more typically in an amount of not greater than about 30 weight percent. All of the aforementioned weight percentages are based on the total weight of the plastic additive system.

In the embodiment wherein the plastic additive system is in a paste form, the additive's liquid component is generally present in an amount of at least about 1 weight percent. Typically, when in this form, the additive's liquid component is present in an amount of at least about 5 weight percent; more typically of at least about 10 weight percent; and even more typically in an amount of at least about 20 weight percent. On the other hand, when in the paste form, the additive's liquid component is generally present in an amount of not greater than about 60 weight percent. Typically, when in this form, the additive's liquid component is present in an amount of not greater than about 50 weight percent; more typically of not greater than about 40 weight percent; and even more typically in an amount of not greater than about 30 weight percent. All of the aforementioned weight percentages are based on the total weight of the plastic additive system.

With regard to the embodiments wherein the multiple polymeric additive system is in an emulsion form, the liquid component can contain water, surfactants, emulsifiers, stabilizers, ionic salts, acid or base, oligomeric species, and the like. Typically, the liquid component contains water. In an emulsion form, the solid component can contain any polymer particle. Typically, polymer particles can be synthesized by an emulsion process or prepared by an alternative polymerization process and then subsequently emulsified. More typically, the solid component contains emulsion-made polymer particles containing acrylic-based or diene-based polymers, or vinyl-halide-based polymers, ethylene-vinyl acetate-based polymers, and the like. The solids weight fractions of emulsion polymerized polymer particles prepared according to one specific embodiment of the present invention are most typically in the range of from more than 40 to 75 weight percent.

The multiple polymeric additive system may also be in the form of a suspension, a dispersion, and a latex, or mixtures thereof. In any one of these forms, the liquid component can contain water, surfactants, emulsifiers, stabilizers, ionic salts, acid or base, oligomeric species, suspending agents such as polyvinyl alcohol and/or a variety of ionic and nonionic surfactants, and the like. Various types and specific examples of these components are known to those skilled in the art. The liquid component most typically contains water and a suspending agent. In a suspension form, the solid component can contain any solid additive suitable as a plastic additive. Typically, the solid component contains emulsion-made polymer particles. More typically, the polymer particles contain acrylic-based or diene-based polymers, or vinyl-halide-based polymers, ethylene-vinyl acetate-based polymers, and the like. The solids weight fractions of emulsion polymerized polymer particles prepared according to one specific embodiment are most typically in the range of from more than 40 to 75 weight percent.

In a wet-cake form, the liquid component can contain one or more of the same components as described for the dispersion, latex, suspension, or emulsion, with the addition of coagulating agents. Various coagulating agents are known to those skilled in the art for coagulating particles dispersed in a fluid medium. Typical coagulating agents include mineral salts, acids, bases, solvents, and non-solvents. Typically, the liquid component of a multiple polymeric additive system in a wet-cake form will contain water and one or more coagulating agents. In a wet-cake form, the solid component will contain the first and second polymeric particles and may further contain precipitated coagulating agents. Solids weight fractions in wet-cake forms of multiple polymeric additive systems of this embodiment can be in the range of from 40 to 99 weight percent. Typically, the solids weight fraction in the wet-cake is less than 90 weight percent, and more typically less than 80 weight percent. Wet-cake forms are most typically provided by formation of a polymer particle slurry followed by removal of excess liquid, the liquid being typically water. Any method for removing liquid from slurries as known to those skilled in the art can be used. Accordingly, an increase in solids fraction is typically observed during formation of a wet-cake from a slurry.

Preparation of multiple polymeric additive systems in a paste form typically follows the preparation of a wet-cake. Paste form multiple polymeric additive systems primarily differ from the wet-cake form in that pastes are less friable than wet-cakes; whereas wet-cakes will typically crumble when subjected to mechanical stress, pastes are more likely to plastically deform than crumble when subjected to mechanical stress. In a paste form, the liquid component can contain one or more of the same components as described for the wet-cake. In a paste form, the solid component will contain the first and second polymeric particles and may further contain precipitated coagulating agents. Solids weight fractions in paste forms of multiple polymeric additive systems of this embodiment can be in the range of from more than 40 to 90 weight percent. Typically, the solids weight fraction in the paste is less than 80 weight percent, and more typically less than 75 weight percent.

In the multiple polymeric additive system of the present invention, the solid component further can be at least one of the following: waxes; pigments; opacifiers; fillers; exfoliated clays; toners; antistatic agents; metals; flame retardants; thermal stabilizers; co-stabilizers; co-stabilizers; antiozodants; cellulosic materials; impact modifiers; processing aids; lubricating processing aids; internal lubricants; external lubricants; oils; rheology modifiers; powder flow aids; melt-flow aids; dispersing aids; UV stabilizers; plasticizers; fillers; glass fibers; optical modifiers; surface roughness modifiers; surface chemistry modifiers; adhesion modifiers; surface hardeners; compatibilizers; diffusion barrier modifiers; stiffeners; flexibilizers; mold release agents; processing modifiers; blowing agents; thermal insulators; thermal conductors; electronic insulators; electronic conductors; biodegradation agents; antistatic agents; internal release agents; coupling agents; flame retardants; smoke-suppressers; anti-drip agents; or colorants. Particularly preferred combinations of solid additive components and polymeric additive components are in the following group: flow aids and impact modifiers; impact modifiers and processing aids; processing aids and blowing agents; processing aids and cellulosic fibers, lubricants and cellulosic fibers, impact modifiers and cellulosic fibers, lubricating processing aids and cellulosic fibers, processing aids and lubricants and cellulosic fibers, impact modifiers and processing aids and blowing agents; flow aids and impact modifiers and processing aids; lubricants and impact modifiers; stabilizers and impact modifiers; lubricants and stabilizers and impact modifiers; lubricants and processing aids; stabilizers and processing aids; lubricants and stabilizers and processing aids; oils and impact modifiers; fillers or other inorganics and processing aids; fillers or other inorganics and impact modifiers; clays and impact modifiers; clays and processing aids; biocides and impact modifiers; biocides and processing aids, and the like.

The multiple polymeric additive systems of the present invention can be prepared by any suitable means. The specific means of preparation depends, in part, on the form in which the multiple polymeric additive system will have prior to being incorporated into the polymeric composition, and the make-up of the additive's liquid and solid components. Included below are some specific examples of how to make a multiple polymeric additive system in accordance with the present invention, wherein the additive system is in an emulsion form, a wet-cake form and a paste form.

In one specific embodiment of the present invention there is provided a novel process for making a multiple polymeric additive system which includes a liquid component and a solid component, wherein the solid component includes polymeric additive particles. The novel process requires at least the two steps of (a) providing an aqueous emulsion polymerization reaction mixture comprising a first population of polymer particles and a second population of polymer particles; and (b) polymerizing a first group of one or more ethylenically unsaturated monomers in the aqueous emulsion polymerization reaction mixture so that at least one of said populations of polymer particles increases in mean particle diameter. Although this process requires that after a portion of the first group of one or more ethylenically unsaturated monomers is polymerized the mean particle diameters of the first and second populations of polymer particles differ by at least 50 percent, it is typical that the mean particle diameters differ by at least 100 percent, and more typical that the mean particle diameters differ by at least 200 percent. Although this process also requires that the total weight percentage of the polymer particles in the aqueous emulsion polymerization reaction mixture exceeds 40 weight percent, it is typical that the weight percentage of the polymer particles exceeds 45 weight percent, and even more preferable that the weight percentage exceeds 50 weight percent.

In another specific embodiment of the present invention there is provided a novel process related to the previously described process for making a multiple polymeric additive system. This novel process requires at least the two steps of (a) providing an aqueous emulsion polymerization reaction mixture comprising a first population of polymer particles and a second population of polymer particles; and (b) polymerizing a first group of one or more ethylenically unsaturated monomers in the aqueous emulsion polymerization reaction mixture to form a third population of polymer particles, wherein after a portion of the first group of one or more ethylenically unsaturated monomers is polymerized. Although this process requires that after a portion of the first group of one or more ethylenically unsaturated monomers is polymerized the mean particle diameters of the first and second populations of polymer particles differ by at least 50 percent, it is preferably that the mean particle diameters differ by at least 100 percent, more preferable that the mean particle diameters differ by 200 percent. Although this process also requires that the total weight percentage of the polymer particles in the aqueous emulsion polymerization reaction mixture exceeds 40 weight percent, it is preferable that the weight percentage of the polymer particles exceeds 45 weight percent, and even more preferable that the weight percentage exceeds 50 weight percent.

It is within the purview of this invention that in these two processes for making a multiple polymeric additive system, the first and second populations of polymer particles in the aqueous emulsion polymerization reaction mixture of step (a) can be provided by a dispersion combination of the first and second populations of polymer particles, wherein the dispersion combination is formed by combining separate dispersions of the first and second populations of polymer particles.

It is also within the purview of this invention that in these two processes for making a multiple polymeric additive system, the first and second populations of polymer particles in the aqueous emulsion polymerization reaction mixture of step (a) are provided by a dispersion combination of the first and second populations of polymer particles, wherein the dispersion combination is formed by forming one of the populations of polymer particles in a dispersion of the other population of polymer particles.

It is also within the purview of this invention that in these two processes for making a multiple polymeric additive system, the first and second populations of polymer particles in the aqueous emulsion polymerization reaction mixture of step (a) are provided by a dispersion combination of the first and second populations of polymer particles, wherein the dispersion combination is provided by forming essentially simultaneously the first and second populations of polymer particles in a dispersion.

In the embodiment where there two populations of polymer particles are present, it is within the purview of the present invention that both populations grow in size during step (b). Likewise, in the embodiment where a third population of polymer particles forms, it is within the purview of the present invention that at least one of the first and second populations of polymer particles grow in size during step (b), however it is possible that both the first and second populations grow in size during step (b) during formation of the third population of polymer particles. This can be done, when after making the second mode using the soap addition, more soap is added to make the third population of polymer particles.

In another embodiment of the process for preparing a multiple polymeric additive system, three seeds can be provided to the reaction mixture. One specific embodiment is where a third seed is added to the first two. Multi-populations of polymer particles can be prepared using three or more seeds. As more and more modes are added, the maximum solids fraction for a flowable dispersion is theoretically expected to increase.

Accordingly, it is also envisioned that in both of these two-population and three-population embodiments for making a multiple polymeric additive system, that at least one of the first and second populations of polymer particles essentially does not grow in size during step (b). This can be provided where one of the polymer particle is not soluble with monomer, e.g., highly crosslinked, or the polymer in the particle is not soluble with the monomer. Alternatively, where the rate of polymerization in one seed population is substantially faster than in a second seed population, then (for kinetic reasons) the second population would essentially not grow under these conditions.

As well, in the three-population process, it is further envisioned to be within the purview of this invention that both the first and second populations of polymer particles essentially do not grow in size during step (b). As discussed above, it is possible to provide two populations of polymer particles which do not grow in size, however the addition of extra soap results in make an additional one or more modes which can grow in size. Alternatively, an independent mode can be prepared using a large swollen particle and smaller emulsion polymer particles so that independent polymerization in two different modes result. Other combinations of growing and non-growing polymer particles can be envisioned for providing various populations of polymer particles.

In both of these processes for making a multiple polymeric additive system having either two and three particle populations, it is envisioned that the mean particle diameter of the first and second populations of polymer particles is typically at least 10 nm, preferably at least 30 nm, and most preferably at least 50 nm. Likewise, it is envisioned that the mean particle diameter of the first and second populations of polymer particles is typically at most 50,000 nm, preferably at most 15,000 nm, and most preferably at most 1,000 nm.

In both of these processes for making a multiple polymeric additive system having either two and three particle populations, it is also envisioned that the weight ratio of the first population of polymer particles to the second population of polymer particles are in the range of from 10:90 to 90:10. Generally for impact modifiers, the smaller population is provided at a weight fraction typically in the range of from 40% to 60%.

In both of these processes for making a multiple polymeric additive system having either two and three particle populations, the chemical compositions of the polymer particles in the first and second populations are essentially different, but they may also be physically the same or different. An example of physical differences is wherein the ethylenically unsaturated monomers form a polymer in step (b) having a Tg according to the Fox equation of less than 25° C., which is typical for forming rubbery polymers. In contrast, in the present invention for making a multiple polymeric additive system, the ethylenically unsaturated monomers form a polymer in step (b) having a Tg according to the Fox equation of at least 25° C., which is typically characteristic of forming hard polymers. For providing polymer Tg less than 25° C., typical monomers include: C1 to C18 alkyl acrylates such as butyl acrylate, ethyl acrylate, 2-ethylhexyl acrylate; diene monomers; vinyl acetate monomers; and copolymers thereof, and the like. For Tg greater than 25° C., typical monomers include: C1–C4 alkyl methacrylates; vinyl aromatic monomers, acrylonitrile monomers, and copolymers thereof, and the like. One skilled in the art can combine these monomers in various ratios for the purposes of preparing "hard" versus "soft", and "brittle" versus "rubbery" polymer phases in one or more specific embodiments of the two polymeric additive particles.

It is further envisioned that in the present invention for making a multiple polymeric additive system, both of the processes for making two-, and three-particle populations may further contain a third step (c), which involves polymerizing a second group of one or more ethylenically unsaturated monomers in the presence of at least the first and second population of polymer particles to provide a polymer adjacent to the surfaces of the polymer particles of the first and second populations. In this additional step, it is envisioned that the second group of one or more ethylenically unsaturated monomers can be the same as or different than the first group of one or more ethylenically unsaturated monomers. In varying the properties of impact modifiers, for example, one typically controls: degree of crosslinking in the core rubber; degree of graft-linking of polymer shells to underlying phases, such as the core; molecular weight of the polymer shell; and morphology (e.g., a shell or diffusion of particles into the core). In this additional step, it is also envisioned that the second group of one or more ethylenically unsaturated monomers is polymerized after at least a portion of the first group of one or more ethylenically unsaturated monomers is polymerized. It is within the purview of this invention that any combination of cores, shells, interpolymer phases, monomers, crosslinkers, and graftlinkers is possible for preparing polymeric additive particles.

In these embodiments wherein a second group of ethylenically unsaturated monomers are polymerized, it is within the purview of the present invention that the second group of monomers is polymerized after essentially all of the first group of monomers are polymerized. This step is useful for controlling morphology.

As a specific embodiment of the present invention for making a multiple polymeric additive system, it is envisioned that the first group of monomers forms a rubbery core polymer and the second group of monomers forms a hard shell polymer. Rubbery core monomers include, for example, alkyl acrylates. The rubbery core monomers may also include one or more crosslinkers in the amount of about 1% to 5% based on monomers. In the case where the rubbery monomers include diene monomers, crosslinker may not be necessary as diene monomers tend to self-crosslink. Such self-crosslinking depends on the reaction conditions and post-reaction conditions as known in the art. The hard shell monomers may contain, as a specific example, methyl methacrylate and styrene. Although the rubber core polymer component as just described in certain polymeric additives should be at least 50%, it is further desirable that the rubbery core polymer is greater than 70%, and in certain cases it is desirable that the rubbery component is present in amounts of from 80 to 100 weight percent, said weight percentage being based on the total weight of the rubbery core and hard shell polymers. It is also envisioned that the polymeric impact modifier polymer particle has no shell polymer, e.g., using a 100% rubbery core is possible, such as a crosslinked alkyl acrylate rubbery polymer particle, for impact modifying PVC.

Oftentimes, in the present invention for making core/shell type polymer particles, the second group of monomers can be added to the reaction mixture before the first group have been completely polymerized, so that both monomers from the first and second groups are simultaneously present in the reaction mixture. In this situation, it is also envisaged that while the second group of monomers do not necessarily copolymerize with the unpolymerized monomers from the first group, it is oftentimes desirable that at least a portion of the second group of monomers copolymerize with a portion of the unpolymerized monomers from the first group of monomers. Likewise, it is oftentimes desirable that at least a portion of the second group of monomers copolymerizes with essentially all of the unpolymerized monomers from the first group of monomers. This process may be controlled by comparing the reactivity ratios of monomers as known in the art. This process can be controlled to prepare either separate, alternating, blocky, or random copolymers as known in the art.

With regard to one specific example wherein the multiple polymeric additive system is in an emulsion form, reactants (e.g., monomers, initiators, emulsifiers, and optional chain transfer agents, etc.) are typically combined in a reactor with a liquid medium (e.g., an aqueous medium) to form a mixture. Thereafter, and/or simultaneously therewith, the mixture is reacted while in the presence of the liquid medium. The reactants can be added slowly (gradually, as in a semi-batch process), over time, continuously, or quickly as a "shot" (batch) into the reactor. Emulsion polymerization techniques for preparing polymer particles are typically carried out in a suitable reactor wherein the reactants (monomers, initiators, emulsifiers, pH buffers, salts, acids, bases, optional chain transfer agents, and the like) are suitably combined and mixed, and reacted in an aqueous medium, and wherein heat may be transferred in to, and away from, the reaction zone. The reactants can be added slowly (gradually, as in a semi-batch process) over time, quickly as a "shot" (batch), or continuously into the reactor.

In another specific example wherein the multiple polymeric additive system is in an emulsion form, the process encompasses at least the following steps. First, an aqueous emulsion polymerization reaction mixture is provided which includes a first and second population of polymer particles. These polymer particles as provided for in the reaction mixture are typically referred to by those skilled in the art of emulsion polymerization as "polymer seed particles", "seed particles", or simply "seed". It is also known to those skilled in the art that polymer particles formed in one step may be further used as seed particles in another step. Then, a first group of one or more ethylenically unsaturated monomers is polymerized in the aqueous emulsion such that: the mean particle diameters of the first and second populations of polymer particles differ from each other by at least 50 percent, and the total weight percentage of the polymer particles in the aqueous emulsion polymerization reaction mixture exceeds 40 weight percent. After the polymer particle populations are provided for in a reaction mixture, monomers are subsequently added in order to provide for "grow out" of one or both of the polymer seed particle populations. In this invention it is envisioned that when both seed particle populations "grow out", this grow-out can occur simultaneously or at different times.

Methods for polymer seed grow out are well known in the art. These methods are useful for preparing polymer particles having a particle size in the range of from 10 nm to 1,500 nm. Typically, monomer and initiator are added to the reaction mixture at conditions to initiate and polymerize monomer as it is added to the reaction mixture. Typically, the polymer particle size will increase with increasing seed size.

Accordingly, the seed size range can vary from 10 nm to 1,500 nm. In this embodiment, the seed size is typically at least 30 nm, more typically at least 50 nm, and most typically at least 70 nm.

One specific example of providing an emulsion polymer of at least two populations of polymer particles is where a single polymer seed and excess soap is provided into the reaction mixture so that upon addition of monomer, a second population of polymer particles is formed. In this example, the amount of excess soap that is required to form the second population of polymer particles will vary with the type of soap, and conditions of the reaction media to form micelles. Subsequent or simultaneous addition of monomer and initiator into the reaction mixture thereby forms the second population of polymer particles. This is followed by one or more additional "grow out" steps as described above. Further steps providing additional populations of seed particles followed by grow-out are also envisioned within the scope of the present invention.

Another specific example is where seeds of two or more sizes are provided, followed by a swelling process. Seeds of two or more sizes can be provided as previously described. The swelling process typically involves adding emulsified monomers, or mixtures of monomers to seed particles present the aqueous reaction media so that the seed particles swell with monomer prior to forming polymer. The initiator is typically present in the monomer mixture or subsequently added to the reaction mixture. Then, the monomers are polymerized after swelling. By this process, there is no limitation to the upper size of the mean polymer diameter.

Another specific example of forming two populations of polymer seed particles is provided where polymer seed particles of a single mode are partially agglomerated (i.e. "microagglomerated", as known in the art). In this example, the seed particles agglomerate to different extents, thereby forming multimodal populations of seed particles. Although such microagglomeration steps typically require polymer particle solids levels less than 40%, it is envisioned that further swelling and/or grow-out steps applied to such microagglomerated seed particles will result in formation of multiple polymeric additive systems having solids fractions greater than 40%.

Preparing a combination of two polymer particle populations which differ in composition and/or particle size can be provided using two seeds which vary in size and/or composition. The final size of the particles depend on the starting size and the starting composition of the seeds. If the seeds are the same compositions, then they typically grow and/or swell at similar rates of "mass uptake". The term "mass uptake" refers to the increase in mass of the polymer particles arising from additional monomer and/or polymer.

Rates of mass uptake may be estimated according to polymer thermodynamic principles known to those skilled in the art. For example, if the seed compositions are different, then the rate of mass uptake will generally be different. If the seeds are same composition but different size, then the larger seed particles will generally remain larger during mass uptake. As well, increasing the molecular weight of the polymer in the seeds generally provide for smaller final polymer particles. Generally, these and other guidelines for controlling polymer particle size are estimable via equilibrium swelling calculations according to the principles of polymer thermodynamics and reaction kinetics as known to those skilled in the art.

Typically, particle sizes in the range of from 100 nm to 50,000 nm can be provided using the swelling process. More typically, polymer particles in the range of from 1,000 nm to 50,000 nm are readily prepared by a swelling process.

It is also envisioned that one or more of these methods may be combined to prepare the multiple polymeric additive systems of the present invention. Those skilled in the art would be able to readily determine which specific process best suits their needs after reading this specification.

In yet another specific example wherein the multiple polymeric additive system is in an emulsion form, the process encompasses at least the following steps. First, an aqueous emulsion polymerization reaction mixture is provided which includes a first population and second population of polymer particles. Then, a first group of one or more ethylenically unsaturated monomers is polymerized in the aqueous emulsion such that a third population of polymer particles is formed. Formation of the third population can be provided by the addition of excess soap to form seed particles as described in a previous embodiment, or they can be added separately. The step of swelling and/or grow-out of the first, second, and/or third population of polymer particles subsequently follows according to the procedures described in a previous embodiment.

In another embodiment of the present invention, non-aqueous polymerization is used to prepare the solid component containing a first and second population of polymer particles. This can be provided for, by example, using dispersion polymerization wherein a solvent, such as an alcohol, is the reaction medium. The reaction medium is mixed with one or more monomers, wherein the polymer is formed and may precipitate out of the solvent to form a first population of polymer particles. Subsequent steps of adding further monomer to form additional populations of polymer particles are provided to form a multiple plastics additive system.

Inverse emulsion polymerization methods are also envisioned for preparing polymer particles useful in multiple polymeric additive systems. These methods, which are known to those skilled in the art, incorporate an aqueous phase which is dispersed in an organic phase. In this method, water-soluble monomers which prefer the aqueous phase polymerize to form polymer particles dispersed in an organic phase.

Various methods for preparing populations of polymer particles include solution polymerization, dispersion or suspension polymerization, microemulsion polymerization, miniemulsion polymerization; jet-droplet polymerization; screen-droplet polymerization, and the like. These various methods are useful for preparing polymer particle dispersions having a mean particle diameter in the range of from 20 nm to 50,000 nm. Typically, the liquids present in this method include water and/or organic solvents, the range and type of each for these polymerization methods are known to those skilled in the art.

These various methods for preparing populations of polymer particles typically include one or more of the liquids in the following group: monomers, solvents, non-solvents, chain transfer agents, initiators, soaps, buffer solutions, stabilizers to prevent polymer particle coalescence, crosslinkers, graft linkers, aqueous phase inhibitors for preventing polymerization in the aqueous phase, and the like. Accordingly, the multiple polymeric additive systems of the present invention typically include one or more of these liquids.

In the multiple polymeric additive system of the present invention the compositions of the first and second populations of polymer additive particles are essentially compositionally different. It is within the purview of the present invention that the first and second populations are essentially compositionally different as long as polymers in both populations share no more than about 85% by weight of the same type of polymeric units. Typically, the two populations will be essentially compositionally the same if they share no more than about 90%, more typically no more than 95%, by weight of the same type of polymeric units.

One specific embodiment of this invention is where solid component of the multiple polymeric additive system contains one or more additional populations of polymeric additive particles. In this embodiment, the one or more additional populations of polymeric additive particles may be compositionally essentially the same as or different than that of the first and second populations.

Examples of polymer particle compositions which are envisioned may be derived from, but are not limited to, the following polymer compositions: polymers derived from diene, diene/vinyl aromatic, or crosslinked diene/vinyl aromatic monomers; polymers derived from (C1 to C20) alkyl (meth)acrylates; copolymers derived from (C1 to C20) alkyl (meth)acrylates, (e.g. 2-ethylhexyl acrylate mixed with a butyl acrylate); copolymers derived from (C1 to C20) alkyl (meth)acrylates which vary in comonomer ratio; copolymers derived from (C1 to C20) alkyl (meth)acrylates which vary in comonomer ratio to provide for differences in glass transition temperatures, e.g., high Tg (greater than 75 C.) polymer and low Tg polymer and (less than 0 C.); ethylene-vinylacetate ("EVA") type copolymers; chlorinated polyethylene ("CPE"); polymers derived from olefins; copolymers or blends containing copolymers derived from (C1 to C20) alkyl (meth)acrylates mixed with EVA or chlorinated polyethylene ("CPE") or polyolefins.

Examples of different polymer particle compositions which are envisioned include wherein the polymer particles contain: an impact modifier and a processing aid, e.g., polymer 1 containing greater than 50% low Tg component, polymer 2 containing greater than 50% high Tg component; two processing aids ("PA"), e.g., two substantially uncrosslinked polymers, with greater than 50% high Tg component; a lubricating PA plus a PA, e.g., uncrosslinked polymers, at least one greater than 50% high Tg polymer, the other derived from butylacrylate and styrene). In addition, acrylonitrile ("AN") containing polymers, typically styrene-AN based processing aids and/or the butadiene-styrene-AN impact modifiers are combinable in the present invention. Combinations of polyolefin and fluoropolymer particles, both of which can be made by solution, are also combinable.

One specific embodiment of different types of polymeric additive particles is where the first and second populations are useful as impact modifiers and the additional one or more populations are useful as processing aids. Another specific embodiment of different types of polymeric additive particles is where the first and second populations are useful as processing aids and the additional one or more populations are useful as impact modifiers. Combinations of various polymeric additives are readily envisioned to those skilled in the art.

Another specific embodiment wherein the multiple polymeric additive system contains different compositions of polymer particles is when a balance of impact efficiency and UV resistance is desired. In this case, different compositions can be provided by the following process: emulsion blend of a diene-derived impact modifier with an acrylic-derived impact modifier. For the purposes of preparing a multiple polymeric additive system containing a solids component in excess of 40 weight percent, it is envisioned to start with two diene-type polymer seed particles varying in diameter and composition for preparing the first and second populations of polymer particles varying at least 50% in diameter. Diene-type monomers are subsequently polymerized in the presence of these seed particles to form the first and second populations of diene-derived polymer particles. Additional seed particles are either added to or formed in the reaction media containing the first and second populations of diene-derived polymer particles. Subsequently, polymerization of another type of one or more monomers, such as a (C1–C20) alkyl (meth)acrylates form on or in the additional seed particles. Following this specific embodiment, one could make a methacrylate-butadiene-styrene ("MBS")-type impact modifier further containing an acrylic processing aid at a solids concentration of greater than 40%.

In one embodiment of preparing a multiple polymeric additive system in which a polymeric component is modified by use of the multiple polymeric additive system, the multiple polymeric additive systems which are typically used in this process can have a solid component containing one or more additional populations of polymer particles which are different than the first and second populations of polymer particles. These differences can arise from physical property differences. Examples of physical property differences include: size, shape, glass transition, hardness, refractive index or other optical properties, thermal or UV stability, and the like. Polymer particle differences may also arise from differences in chemical properties. Examples of chemical property differences include: monomer compositions, surface activity, copolymer composition and sequencing, ratio and composition of different polymer phases within the particles, molecular weight, presence of functional or reactive groups on the polymer, morphology, and the like.

In another embodiment of preparing a multiple polymeric additive system, any of the one or more of these liquids can be readily incorporated into the liquid component of the polymeric additive by direct addition, emulsification or suspension by suspending agents in water or a suitable solvent, and optionally applying shear. The amount of these liquids in the liquid component can be in the range of from 0 to 100 weight percent; typically from 0 to 20 weight percent; most typically from 0 to 10 weight percent of the liquid component. The amount of emulsion stabilizers can be in the range of from 0 to 100 weight percent; typically from 0 to 5 weight percent; most typically from 0.01 to 2 weight percent of the liquid component. The amount of defoamers can be in the range of from 0 to 100 weight percent; typically from 0 to 10 weight percent; most typically from 0 to 5 weight percent of the liquid component.

Depending on the desired end use and properties, the amount of liquid components, such as plasticizers, organic solvents, alcohols, esters biocides, UV stabilizers, leveling agents, lubricants, oils, dyes, rheology modifiers, thermal stabilizers, antiozodants, and or mold release agents, can be in the range of from 0 to 100 weight percent; typically from 0 to 20 weight percent; and most typically from 0 to 10 weight percent of the liquid component. When two or more of the aforementioned liquids are present in the liquid component of the multiple polymeric additive system then it is apparent that their total weight fraction can be no higher than 100% based on the total weight of the liquid component.

In one specific embodiment of the process for preparing a multiple polymeric additive system, a dispersion of solid or liquid lubricant particles can be incorporated in to the multiple polymeric additive system by emulsifying the solid or liquid lubricant in water or other non-solvent with a surfactant and shear mixing. The lubricant emulsion is then mixed into the multiple polymeric additive system. In a similar fashion, the solid or liquid lubricant may be emulsified in an emulsion, latex, dispersion, or suspension containing one or more other components of the multiple polymeric additive system as another embodiment. One specific example is where the lubricant may be emulsified by adding a surfactant and shear mixing in a multiple emulsion containing the two or more populations of polymeric additive particles. In a similar fashion, because thermal stabilizers are mostly provided as liquids, oils, solids which are typically non-soluble in water, thermal stabilizers may also be emulsified and added to the multiple polymeric additive system according to these procedures.

In another embodiment of the process for preparing a multiple polymeric additive system, the liquid component may contain a water-soluble thermal stabilizer by providing a suitably high polarity reactive ligands which react to tin or other metals known in the art of stabilization. High-polarity character is provided to the ligands by typically providing short alkyl groups, which typically have low molecular weight. Examples include mercapto ethanol or thio glycolic acid.

In another specific embodiment of the process for preparing a multiple polymeric additive system, stabilizers and lubricants may be incorporated into the liquid component with organic solvents as the liquid phase. Because stabilizers and lubricants typically are insoluble in water, they may be incorporated into the liquid component of the multiple polymeric additive system by using organic solvents and optionally soap to help dissolve or disperse them. In this regard, various solvent/oil/aqueous/soap combinations may be employed to provide dispersions or solutions of one or more additives, such as stabilizers and lubricants, in the liquid component of the multiple polymeric additive system.

In another specific embodiment of the process for preparing a multiple polymeric additive system, various liquid and solid components, such as stabilizers and co-stabilizers, may be microencapsulated by polymerizing an encapsulating polymer via suspension or emulsion polymerization in the presence of an emulsion, suspension, dispersion, or slurry of stabilizer particles as provided in the process described above.

Co-stabilizers are also important and include but are not limited to epoxidized soybean oil ("ESO"), phosphite-based organic compounds, betadiketones, and certain mineral fillers. The certain mineral fillers which function as co-stabilizers typically include hydrotalcites which are insoluble solids in most liquids. Co-stabilizers are typically used along with various tin-based, and mixed metal-based and lead-based thermal stabilizers and the like as known in the art. Co-stabilizers typically scavenge hydrochloric acid that forms during degradation of PVC. Typically, this scavenging occurs by the co-stabilizer chelating with the PVC's degradative by-products. Other co-stabilizers include antioxidants which arrest oxidative degradation.

Other stabilizers which can be incorporated in the multiple polymeric additive system's liquid component include uracil derivatives, and the like. Typically, 0–10% by weight of these nitrogen-containing stabilizer components are useful to reduce degradation in polymeric resins, such as PVC. Various uracil derivatives can be incorporated in the present invention as other stabilizing agents as described above. Examples of such uracil derivatives include: 2-phenylindoles; aminocrotonates; N-substituted maleimides; uracil; the 1,3-dialkyl-6-amino-uracil derivatives described in German Patent 19,741,778, and pyrollodiazinediones described in Australian Patent App AU-A48232-96.

In another specific embodiment of the process for preparing a multiple polymeric additive system, various blowing agents for foaming polymeric compositions can also be incorporated into the multiple polymeric additive system. Various blowing agents are known in the art and can be used in the invention herein. Typical blowing agents thermally degrade at elevated temperatures and form a gas. When blended into molten polymer, the production of gas causes the molten polymer to form a foam or cellular structure. Typical blowing agents include azo compounds and sodium borohydride, both of which can be used in liquid medium and thereby added to the multiple polymeric additive system's liquid component.

In another specific embodiment of the process for preparing a multiple polymeric additive system, the liquid component contains essentially no water. One specific example for providing this embodiment is where a portion of the solid component of the multiple polymeric additive system is provided by a solution polymer and a portion of the liquid component is provided by the solvent used in preparing the solution polymer. Another example is wherein polymer particles prepared in aqueous media are first dried then redispersed in a non-aqueous liquid. Any of the various methods know in the art of providing polymeric particles substantially devoid of water can be used in this embodiment of the invention.

In another embodiment for preparing a multiple polymeric additive system, the polymeric additive particles may contain at least two different polymeric additives selected from the following group: impact modifiers; processing aids; lubricating processing aids; optical modifiers; hollow spheres; waxes; toners; antistatic agents; cellulosic materials; oils; rheology modifiers; powder flow aids; melt-flow aids; dispersing aids; plasticizers; fillers; optical modifiers; surface roughness modifiers; surface chemistry modifiers; adhesion modifiers; surface hardeners; compatibilizers; diffusion barrier modifiers; stiffeners; flexibilizers; mold release agents; processing modifiers; blowing agents; thermal insulators; thermal conductors; electronic insulators; electronic conductors; biodegradation agents; internal release agents; coupling agents; flame retardants; smoke-suppressers. These other additives can be incorporated by the following processes: Direct addition of the additive into the polymer liquid system, emulsification or suspension of the second additive into the polymeric liquid additive, copolymerization or encapsulation, of the second additive component during the preparation of the polymeric liquid additive, polymerization of the liquid additive in the presence of the second additive to form an in-situ blend, addition of the second additive during a subsequent blending or drying or isolation step.

In another embodiment for preparing a multiple polymeric additive system, the polymeric additive particles can be spherically-shaped. Processes for preparing spherical shaped particles include: emulsion, solution, suspension, dispersion, mini-emulsion, micro emulsion. Other particles that are not spherical in shape which are envisioned include: multilobe, raspberry, dumbbell, high aspect ratio ellipsoidal particles, and fibers, and the like. Such non-spherical particles can be made according to processes known in the art.

Another embodiment of this invention encompasses novel polymeric compositions that include a polymeric component and a polymeric additive component. In this embodiment, the novel polymeric composition is prepared by a process which includes the step of forming a blend of at least the polymeric component and a multiple polymeric additive system, wherein the multiple polymeric additive system includes a liquid component and a solid component. The multiple polymeric additive system's solid component, in turn, includes at least two populations of polymeric additive particles. These polymer particle populations are essentially compositionally different. The solids weight fraction of the multiple polymeric additive system is also more than 40% based on the total weight of the multiple polymeric additive system. It is within the purview of the process for preparing the polymeric compositions that one or more additional populations of polymer particles may also be present in the solid component of the multiple polymeric additive system. The one or more additional populations of polymer particles may differ with regard to at least one of the following: the property which they will impart to a polymeric composition into which they can be added, their size, their chemical composition, their physical state and/or their shape.

Another embodiment of the present invention encompasses making a polymeric composition comprising a polymeric component and a multiple polymeric additive system. In this embodiment, the process includes the step of (I) contacting the polymeric component with a multiple polymeric additive system to form a mixture, wherein the multiple polymeric additive system includes a) a liquid component, and b) a solid component. In this embodiment, the solid component includes at least polymeric additive particles, wherein the polymeric additive particles includes at least (i) a first population of particles, and (ii) a second population of particles, wherein the compositions of the polymer particles in the first and second populations are essentially different. While the weight percentage of the solids component of the multiple polymeric additive system in this embodiment is typically more than 40 weight percent, of the total weight percentage of the multiple polymeric additive system, the solids weight percentage can be even greater.

In this embodiment of the invention, the process also includes the step of (II) removing at least a portion of the liquid component from the mixture. Any of the water removal methods known in the art of polymer processing may be used. These include dewatering at various points in the processes (e.g. dewatering with the polymeric component, dewatering prior to blending, dewatering during the blending, dewatering in the extruder and so forth are typical operations used to remove water. Typically the liquid is being volatilized by heat to affect removal. Various filtration methods such as ultrafiltration, micro filtration, reverse osmosis, and the like can also be used for increasing the solids concentration of flowable forms of the multiple polymeric additive system. Flowable forms of the multiple polymeric additive system include liquid, solution, emulsion, latex, suspension, slurry, dispersion, and the like.

Various other embodiments of making a polymeric composition by blending a polymeric resin with the multiple polymeric additive system, are envisioned in the following list of modifications to the process. Further details are provided in this document:

In step (I) the liquid component may be present in an amount of at least 1 weight percent, said weight percentage being based on the total weight of the multiple polymeric additive system.

In step (I) the liquid component may be present in an amount of less than 60 weight percent, said weight percentage being based on the total weight of the multiple polymeric additive system.

In step (I) the solid component may be present in an amount of more than 40 weight percent, said weight percentage being based on the total weight of the multiple polymeric additive system.

In step (I) the polymeric additive particles are present in an amount of at most 99 weight percent, said weight percentage being based on the total weight of the multiple polymeric additive system.

In step (I) the liquid component may contain at least 5 weight percent water, said weight percentage being based on the total weight of the multiple polymeric additive system's liquid component.

In step (I) the liquid component may contain at most 100 weight percent water, said weight percentage being based on the total weight of the multiple polymeric additive system's liquid component.

In step (I) the liquid component may contain at least one liquid from the following group: water; organic solvents; alcohols; esters; plasticizers; emulsion stabilizers; defoamers; leveling agents; biocides; UV stabilizers; lubricants; oils; dyes; rheology modifiers; thermal stabilizers; co-stabilizers; antiozodants; mold release agents, oligomers, monomers, and the like and combinations thereof.

In step (I) the liquid component may contain essentially no water.

The polymeric additive particles contain at least one polymeric additive selected from the following group: impact modifiers; processing aids; lubricating processing aids; optical modifiers; hollow spheres; waxes; toners; antistatic agents; cellulosic materials; oils; rheology modifiers; powder flow aids; melt-flow aids; dispersing aids; plasticizers; fillers; optical modifiers; surface roughness modifiers; surface chemistry modifiers; adhesion modifiers; surface hardeners; compatibilizers; diffusion barrier modifiers; stiffeners; flexibilizers; mold release agents; processing modifiers; blowing agents; thermal insulators; thermal conductors; electronic insulators; electronic conductors; biodegradation agents; internal release agents; coupling agents; flame retardants; smoke-suppressers.

The polymeric additive particles may be spherically-shaped.

The first population of polymeric additive particles may have a mean particle diameter in the range of from 10 nm to 50,000 nm.

The second population of polymeric additive particles may have a mean particle size distribution ranging from about 10 nm to about 50,000 nm.

The multiple polymeric additive system may be in the form of at least one of the following: an emulsion, suspension, dispersion, latex, paste, pellet, powder, or a wet-cake.

The solid component of the multiple polymeric additive system may further contain at least one of the following: waxes; pigments; opacifiers; fillers; exfoliated clays; toners; antistatic agents; metals; flame retardants; thermal stabilizers; co-stabilizers; antiozodants; cellulosic materials; impact modifiers; processing aids; lubricating processing aids; internal lubricants; external lubricants; oils; rheology modifiers; powder flow aids; melt-flow aids; dispersing aids; UV stabilizers; plasticizers; fillers; optical modifiers; surface roughness modifiers; surface chemistry modifiers; adhesion modifiers; surface hardeners; compatibilizers; diffusion barrier modifiers; stiffeners; flexibilizers; mold release agents; processing modifiers; blowing agents; thermal insulators; thermal conductors; electronic insulators; electronic conductors; biodegradation agents; antistatic agents; internal release agents; coupling agents; flame retardants; smoke-suppressers; anti-drip agents; or colorants.

The polymeric component may contain at least one of the following: polyamides, aromatic polyesters, polycarbonate, styrene-acrylonitrile copolymers, styrenic resins, methyl methacrylate copolymers, polyolefins, polyvinyl halides, polyamides, epoxy resins, polyacetals, polyurethanes, and thermoset resins, poly ether ketones, polyarylates, polysulfones, polyimides, and the like, and copolymers, grafts, and blends thereof.

When forming the blend, the polymeric component may be initially in a liquid phase.

When forming the blend, the polymeric component may be initially in a solid phase.

After forming the blend, the polymeric component may be in a liquid phase.

After forming the blend, the polymeric component may be in a solid phase.

When forming the blend, the polymeric component reacts with at least a portion of the multiple polymeric additive system's liquid component.

When forming the blend, the polymeric component reacts with at least a portion of the multiple polymeric additive system's solid component.

When forming the blend, the polymeric component does not react with either the multiple polymeric additive system's solid component or the polymeric additive's liquid component.

When forming the blend, the at least a portion of the multiple polymeric additive system's solid component reacts with at least a portion of the polymeric additive's liquid component.

When forming the blend, the multiple polymeric additive system's solid component does not react with the polymeric additive's liquid component.

When forming the blend, at least a portion of the multiple polymeric additive system's solid component forms a by-product.

When forming the blend, the at least a portion of the multiple polymeric additive system's liquid component forms a by-product.

When forming the blend, neither the multiple polymeric additive system's solid component nor the polymeric additive's liquid component forms a by-product.

After forming the blend, the blend may contain at least a portion of the polymeric additive's liquid component.

After forming the blend, the blend may be formed into a product comprising at least a portion of the polymeric additive's liquid component.

After forming the blend, the blend may be formed into a product comprising essentially none of the polymeric additive's liquid component.

After forming the blend, the blend may contain essentially none of the polymeric additive's liquid component.

The polymeric composition further may contain at least a second multiple polymeric additive system.

When forming the blend, at least a portion of the second multiple polymeric additive system may react with at least a portion of the first multiple polymeric additive system.

When forming the blend, essentially none of the second multiple polymeric additive system may react with the first multiple polymeric additive system.

When forming the blend, at least a portion of the second multiple polymeric additive system may react to form a by-product.

When forming the blend, essentially none of the second multiple polymeric additive system may react to form a by-product.

The polymeric composition may contain at least one of the following: waxes; pigments; opacifiers; fillers; exfoliated clays; toners; antistatic agents; metals; flame retardants; thermal stabilizers; co-stabilizers; antiozodants; cellulosic materials; impact modifiers; processing aids; lubricating processing aids; internal lubricants; external lubricants; oils; rheology modifiers; powder flow aids; melt-flow aids; dispersing aids; UV stabilizers; plasticizers; fillers; optical modifiers; surface roughness modifiers; surface chemistry modifiers; adhesion modifiers; surface hardeners; compatibilizers; diffusion barrier modifiers; stiffeners; flexibilizers; mold release agents; processing modifiers; blowing agents; thermal insulators; thermal conductors; electronic insulators; electronic conductors; biodegradation agents; antistatic agents; internal release agents; coupling agents; flame retardants; smoke-suppressers; anti-drip agents; or colorants.

After forming the blend, the blend may be formed into an article.

After forming the blend, the blend may be used to form an article.

The polymeric component may be in powder form.

The polymeric component may be in the form of wet-cake.

The polymeric component may be in the form of a melt.

The multiple polymeric additive system may be in the form of an emulsion.

The multiple polymeric additive system may be in the form of coagulated slurry or wet-cake.

The polymeric additive particles may contain at least 10 percent by weight of a rubbery core.

In polymeric additive particles containing a rubbery core, the rubbery core may exceed 70 percent by weight of the graft copolymer.

In polymeric additive particles containing a rubbery core, the rubbery core may be from 90 to 95 percent by weight of the graft copolymer.

The dry weight ratio of multiple polymeric additive system to polymeric component polymer may be in the range of from 0.1:99.9 to 50:50.

In one process for preparing a polymeric composition in which a polymeric component is modified by use of the multiple polymeric additive system of the present invention, the polymeric component and at least one multiple polymeric additive system are blended to form the polymeric composition. The blending step can occur by one or more of the following processes: blending of the multiple polymeric additive system into a polymeric component. Typically, the multiple polymeric additive system will have a flowable form such as an emulsion, fluid, latex, slurry, dispersion, or suspension. The blending step may occur during any of the stages of preparation of the polymeric component. These stages include synthesis and/or subsequent isolation and compounding; blend mixing of the multiple polymeric additive system into the polymeric component, the polymeric component typically having a solid form. A variety of solid forms of the polymeric component includes: powder, granules, and pellets. The polymeric component may also have a flowable form such as an emulsion, fluid, latex, slurry, dispersion, or suspension.

In a specific embodiment for preparing the polymeric composition by blend mixing the polymeric component with the multiple polymeric additive system, blend mixing may occur with or without the use of mechanical agitation and heat. Blend mixing may occur by addition of the multiple polymeric additive system directly to the polymeric component in the melt state. The melt state may occur during a final melt processing step for fabrication or during an intermediate melt processing step to prepare polymer blends for subsequent processing and final shaping. A typical process is where multiple polymeric additive system is added to the polymeric component, the polymeric component having a powder form. This is followed by shear agitation and optional heat treatment to provide a polymeric composition in the form of a powder blend. The resulting powder-form polymeric composition is suitable for melt processing by any of the standard melt processing techniques known in the art of polymer and plastics processing. These processing techniques typically include extrusion, kneader compounding or static mixing, injection molding, blow molding, thermoforming, calendering, and the like. Heat can be supplied by mechanical friction using, for example, thermokinetic blenders, kneaders or extruders, or by electrical means, say, in an electrically heated device. Additionally, the use of vacuum to remove low-boiling liquid components like water, can often be done effectively.

Another way that the blending step may be accomplished is by the addition of the multiple polymeric additive system to the polymeric component while the polymeric component is being synthesized. As a specific example, multiple polymeric additive systems containing water in the liquid component can be readily blended with aqueous-prepared polymeric components in the polymeric component reaction vessel, suitable container, or in a suitable mixing device. Subsequently, the polymeric composition can be dried using the same or different drying equipment used for the polymeric component. Accordingly, this embodiment envisions that the polymeric component and the polymer additive system may be blended and dried together.

In another embodiment of preparing a polymeric composition in which a polymeric component is modified by use of the multiple polymeric additive system, the polymer particles in the solid component may have the following physical properties: high fraction of low Tg polymer, high molecular weight, refractive index close to or equivalent to that of the polymer. These physical properties are respectfully useful for providing the following functions as a plastic additive: impact modification, processing aid and melt strength enhancement, transparency or low haze.

In another embodiment of preparing a polymeric composition in which a polymeric component is modified by use of the multiple polymeric additive system, the polymer particles in the solid component may also have the following chemical properties: acrylic or saturated chemical structure; polymeric component with composition miscible or compatible with polymeric matrix. These chemical properties are respectfully useful for providing the following functions as plastic additives: thermal and UV stability, dispersion and ease of blending into the polymeric component.

In a specific embodiment of preparing the polymeric composition, the solid component of the multiple polymeric additive system is present in an amount of more than 40 weight percent, said weight percentage being based on the total weight of the multiple polymeric additive system. If the solid component is present in an amount lower than 40 weight percent, then the process for preparing the polymeric additive will not be as economically efficient and eventual removal of the larger amount of liquid phase will be more technically difficult. Typically, the solid component is present in excess of 45 weight percent, more typically in excess of 50 weight percent, and most typically in excess of 55 weight percent.

In another embodiment for preparing a polymeric composition, the solid component of the multiple polymeric additive system is present in an amount of at most 99%, typically at most 75% weight percent, said weight percentage being based on the total weight of the multiple polymeric additive system. If the solid component is present in an amount greater than 75%, then agglomeration and/or high viscosity may interfere with handling and processing of the multiple polymeric additive system.

In another embodiment for preparing a polymeric composition, the liquid component of the multiple polymeric additive system may contain essentially no water. Typically, however, the multiple polymeric additive system contains at least 5 weight percent water when it is added to the process. During processing, however, any volatile components, including water, may be devolatilized so that the remaining amount of liquid component in the polymeric composition after processing is reduced. The weight percentage of the multiple polymeric additive system remaining in the polymeric composition after processing can be in the range of from less than 40% up to 100%, the weight percentage being based on the total weight of multiple polymeric additive system being added in the process. One embodiment in which less than 40% of the multiple polymeric additive system remains in the polymeric composition after processing occurs when all the liquid of a 50% solids multiple polymeric additive system devolatilizes and a portion of the solid component degrades, reacts, or changes form.

In one embodiment for preparing the polymeric composition, the weight fraction of the multiple polymeric additive system remaining in the polymeric composition after processing can be in the range of from 0.01% to 99%, the weight fraction being based on the total weight of the multiple polymeric additive system and the polymeric component. Typically, the weight fraction of the multiple polymeric additive system remaining in the polymeric composition after processing ranges from 0.5 to 40%, more typically from 0.5 to 25%, the weight fraction being based on the total weight of the multiple polymeric additive system and the polymeric component.

In one embodiment for preparing a polymeric composition, the multiple polymeric additive system's liquid component may be 100 weight percent water. When the amount of water in the liquid component is less than 100%, then the liquid component may also contain at least one liquid from the following group: organic solvents; alcohols; esters; plasticizers, such as dioctyl phthalate and the like; emulsion stabilizers; defoamers; leveling agents; biocides; UV stabilizers; lubricants; oils; dyes; rheology modifiers; thermal stabilizers; co-stabilizers; antiozodants; and mold release agents, oligomers, monomers, and the like.

In other embodiments of preparing a polymeric composition, the multiple polymeric additive system is in the form of at least one of the following: an emulsion, suspension, dispersion, latex, paste, pellet, powder, or a wet-cake. Conditions for forming an emulsion, suspension, dispersion, latex, paste, pellet, powder, or a wet-cake are as follows: For emulsion, suspension, dispersion, latex, the basic conditions are those that involve the formation or suspension of an existing polymer phase within a continuous liquid phase. The paste and wet-cake are then distinguished by having partial removal of liquid phase and/or high concentration of (typically agglomerated or coagulated) polymer phase. Pellets and powders would be distinguished by having virtually all the water removed (99%) wherein smaller particles are agglomerated or melt-fused into larger particles (e.g., larger than about 10 microns for powders, macroscopic for pellets).

In one embodiment for preparing a polymeric composition, one or more additional additives may be added along with the multiple polymeric additive system, or independent from the multiple polymeric additive system, to the process. These one or more additional additives include: waxes; pigments; opacifiers; fillers; exfoliated clays; toners; antistatic agents; metals; flame retardants; thermal stabilizers; co-stabilizers; antiozodants; cellulosic materials; impact modifiers; processing aids; lubricating processing aids; internal lubricants; external lubricants; oils; rheology modifiers; powder flow aids; melt-flow aids; dispersing aids; UV stabilizers; plasticizers; fillers; optical modifiers; surface roughness modifiers; surface chemistry modifiers; adhesion modifiers; surface hardeners; compatibilizers; diffusion barrier modifiers; stiffeners; flexibilizers; mold release agents; processing modifiers; blowing agents; thermal insulators; thermal conductors; electronic insulators; electronic conductors; biodegradation agents; antistatic agents; internal release agents; coupling agents; flame retardants; smoke-suppressers; anti-drip agents; or colorants.

In an other embodiment of this process, one or more additional additives may be incorporated into the polymeric composition independent from the multiple polymeric additive system by one or more of the following processes: adding the one or more additional additives directly to the polymeric component during polymerization or manufacture of the polymeric component; post-blending the one or more additional additives into the polymeric component during powder blending or compounding step; adding the one or more additional additives directly into the melt processing step; blending the one or more additional additives with yet an additional additive to form a blended additive, followed by adding the blended additive to the polymeric component or to the polymeric composition.

In one embodiment for preparing a polymeric composition, the polymeric component may contain at least one of any polymeric material known to those skilled in the art. Typical examples of polymeric materials include those in the following group: aromatic polyesters, polycarbonate, styrene-acrylonitrile copolymers, styrenic resins, methyl methacrylate copolymers, polyolefins, polyvinyl halides, acrylonitrile-butadiene-styrene ("ABS") resins, polyamides, epoxy resins, polyacetals, epoxy resins, polyurethanes, thermoset resins, polyketones, polyetheretherketones, as well as blends, grafts, and copolymers thereof.

As types of polymers vary in their sensitivity to moisture and other contaminants present in water, certain multiple polymeric additive systems will be preferred. Because PVC is not very sensitive to moisture under typical processing conditions, then multiple polymeric additive systems for PVC may contain water. However, certain polymers like aromatic polyesters must be essentially devoid of water during processing. Other polymers such as polyamides absorb water and may hydrolyze thereby forming various processing problems as well. The selection of the liquid component of the multiple polymeric additive system will therefore vary with the intended polymeric component in which the multiple polymeric additive system will be used.

In one specific embodiment of the process of the present invention, a multiple polymeric additive system in the form of an emulsion containing more than 40 weight percent solid component and less than 60 weight percent water is added to a PVC powder masterbatch in a high speed mixer. In this example, the masterbatch typically contains various other additives such as lubricants, and stabilizers as known in the art for preparing a rigid PVC profile. In this example, the multiple polymeric additive system contains a population of acrylic processing aid polymeric additive particles and a population of acrylic impact modifier polymeric additive particles. The mean particle diameter of the smaller population is about 100 to 120 nm, and the mean particle diameter of the larger population is about 300 nm to 350 nm. The weight ratio of the smaller to the larger polymer particle populations is about 20:80. The impact modifier polymer particles are crosslinked polybutylacrylate core particles grafted with a polymethyl methacrylate shell. In the impact modifier, the polybutyl acrylate polymer is greater than 90%, the weight percentage based on the total core//shell particle weight, so that the impact modifier polymer particles are not readily isolatable as dry powders. The multiple polymeric additive system/PVC is blended in the high speed mixer thereby producing heat. Water is removed by vaporization arising from the heat generation. After the water is removed, the weight fraction of the remaining solid component of the multiple polymeric additive system in the polymeric composition (i.e., the weight percent of the impact modifier particles in the PVC masterbatch plus impact modifier) is between 1 and 20 weight percent. The resulting polymeric composition is then extruded into a profile. The resulting profile exhibits improved impact strength and processes smoothly compared to that of the unmodified PVC masterbatch.

In one embodiment for preparing a polymeric composition, one or both steps of (I) contacting the polymeric component with a multiple polymeric additive system to form a blend, and (II) removing at least a partial amount of the liquid component from the polymeric composition, may be performed with any type of equipment or operation known in the art or polymer and plastics processing. Examples of these processes include: standard melt processing techniques known to the industry including extrusion or co-extrusion, injection molding, thermoforming, calendering, blow molding, and the like.

In one embodiment for preparing a polymeric composition, when forming the blend, the polymeric component reacts with at least a portion of the plastic additive system's liquid component. Reactive components are useful for: enhancing the dispersion and adhesion between the additive and the polymeric matrix. Examples include the following: incorporation of acid, amide, amines, epoxy groups, anhydride functionality; ionic functionality within the chemical structure of the additive to promote reaction with selective groups in the polymer. Hydroxyl functionalities are also useful for providing compatibility with other polar components. Other examples include the addition of two polymers one with an acid functionality and the other with an epoxide functionality so that they covalently bond during blend processing. Uses of such reactive additive components include improving sag resistance in polymer components have low melt strength.

In one embodiment for preparing a polymeric composition, when forming the blend, the polymeric component reacts with at least a portion of the plastic additive system's solid component. Specifically, the reactive solid components are useful in engineering resin applications in which a reactive epoxide on the shell of a core-shell matrix may react with for example a polyester. Also, use of acid in the shell can react with nylon. These reactions tend to modify the melt rheology and/or cause improved dispersion of the multiple polymeric additive system's solid component in the polymeric composition.

In one embodiment for preparing a polymeric composition, when forming the blend, the polymeric component does not react with either the plastic additive system's solid component or the plastic additive's liquid component. Non-reactive components may be useful for forming of a second phase to enhance the mechanical or rheological properties. Non-reactive components may also be useful for creating a miscible blend in which the polymeric component and one or more of the polymers in the multiple polymeric additive system are mutually dissolved in each other. Examples of non-reactive polymeric components include essentially non-functional polymers, i.e. polymers containing few or no functional groups, such as polyolefins and the like.

In one embodiment for preparing a polymeric composition, when forming the blend, at least a portion of the plastic additive system's solid component reacts with at least a portion of the plastic additive's liquid component. Reactive components are useful for incorporating and chemically bonding the plastic additive with the polymeric component in the polymeric composition. Examples include the following: reactive liquid rubbers suspended in styrene or other free-radically reactive monomers as modifiers for thermoset systems, and the like.

In one embodiment for preparing a polymeric composition, when forming the blend, the plastic additive system's solid component does not react with the plastic additive's liquid component. Non-reactive components are useful for forming non-chemically bonded blend with final system. Non-reactive components may also be used for enabling complete removal of the liquid phase from the polymer composition. For example, adding a polymeric component suspended or dissolved in solvent or water, followed by drying or solvent evaporation is useful for removing the liquid phase from the polymer composition. Also, adding emulsified or non-emulsified mineral oil to an aqueous-based polymeric emulsion as an additive system can be useful for improving melt flow during subsequent processing steps. Also, the polymeric component may be dissolved or dispersed in a liquid lubricant or stabilizer.

In one embodiment for preparing a polymeric composition, when forming the blend, at least a portion of the plastic additive system's solid component forms a by-product. By-product formation is useful where the by-product has a function in the polymeric composition. Typical by-products which are useful may be formed during the blend process or formed during subsequent in-use aging of the product. Useful by-products may be formed during plastics processing conditions using any of a number of known stabilizer technologies. For example, near at or above 200° C., organotin mercaptides, calcium mixed metal carboxylates, and certain organic-based stabilizers are known to react with the potential formation of by-products to stabilize polymeric resins such as PVC. Typically the amounts of stabilizers is between 0.2% to 2% based on resin. During processing, these stabilizers undergo chemical change and thereby form by-products. The stabilizers may undergo complete or partial chemical change to form by-products which are effective at reducing degradation in the PVC resin.

In one embodiment for preparing a polymeric composition, when forming the blend, neither the plastic additive system's solid component nor the plastic additive's liquid component forms a by-product. Typically, if the by-product is deleterious to the formed product, then the by-product particularly not useful. Examples of non-useful by-product formation include the presence of: residual monomers in the multiple polymeric additive system which may lead to unacceptable odor or migration; water or other volatile components which may form gases during the melt processing step; catalysts or other reactive species which may react and promote degradation or post-crosslinking of any of the polymers in the polymeric composition; residual salts or emulsifiers which may promote thermal degradation. Examples include the following: sodium lauryl sulfate, commonly used as a surfactant, is typically known in the art to form the by-products dilauryl ether and sodium pyrosulfate. Such by-products can potentially cause color formation or other instability in the additive-matrix system. Also, ionic species like Ca++ can result in reactions or crosslinking with certain polymer matrices, while anionic species like Cl— can often result in corrosion of metals.

In one embodiment for preparing a polymeric composition, after forming the blend, the blend may contain at least a portion of the plastic additive's liquid component. In this embodiment, the liquid component may function as an additive, such as a plasticizer, stabilizer, lubricant, processing aid, and the like.

In a further embodiment for preparing a polymeric composition, after forming the blend, the blend may be formed into a product comprising at least a portion of the plastic additive's liquid component. This may occur when the polymer blend is melt processed and fabricated into a product using melt processing techniques that do not completely volatilize the liquid component. Typically, the liquid component will have a boiling point near or above the melt processing temperature, and/or the melt processing system is enclosed such that the escape of any volatile components is prevented. This is useful where the liquid component functions as an additive, such as plasticizer, lubricant, process aid, or stabilizer, and the like.

In the liquid removal step, the liquid may be removed form the polymeric composition at various points in the processes, such as dewatering with the polymer matrix, dewatering prior to blending, dewatering during the blending, dewatering in the extruder and so forth.

In a further embodiment for preparing a polymeric composition, the blend may be formed into a product containing essentially none of the plastic additive's liquid component. This may occur when the liquid component is removed during a drying, blending or melt processing step. Typically, the liquid is removed by drying or devolatilization by heat and removal of the gases formed. This process may also be assisted or achieved through other separation processes such as physical separation, e.g. filtering the liquid away from the solid. This is useful where the presence of the liquid would be detrimental to the performance of the polymeric composition. One specific example in which remaining liquid may be detrimental is where the presence of water could adversely affect powder properties of the polymeric composition. Remaining liquid may also be detrimental to the processing rheology of the polymer blend. The appearance and integrity of final plastic parts may also be adversely affected by remaining liquid in the polymeric composition, such as in cases where bubbles are formed due to the presence of water or other volatiles during the melt processing step.

Thus, in a further embodiment for preparing a polymeric composition, the blend may contain essentially none of the plastic additive's liquid component. This can occur during the process where the liquid is removed either prior to or during the melt processing step. Further, in another embodiment the polymeric composition may contain at least a second multiple polymeric additive system. One or more additional multiple polymeric additive systems are useful where additional additives are incorporated either directly into the polymer component or at some point in the subsequent blending, compounding, and/or melt processing steps. This is useful where additional functions not provided by the liquid additive are required or desired, such as thermal stabilization, lubrication, and the like.

Further, at least a portion of the second multiple polymeric additive system may react with at least a portion of the first multiple polymeric additive system. Typical cases where the reactivity between additives is being promoted, can occur when combining stabilizers with certain co-stabilizers. Reactivity between additives is also important where crosslinking and or grafting is desirable, such as in polyols and epoxides for curing certain resin systems.

Further, when forming the blend, at least a portion of the second multiple polymeric additive system reacts to form one or more by-products. In this embodiment, by-product formation may occur in essentially the same fashion as any reactivity of the first polymeric additive as described above.

In further specific embodiment, when forming the blend, essentially none of the second multiple polymeric additive system may react to form a by-product. This is useful where, as described above for the first multiple polymeric additive system, by-products are harmful, such as during the following situations: forming volatiles; forming contaminants such as black specs on the surface of formed plastic articles; forming contaminants which promote degradation, and the like.

In other specific embodiments for preparing a polymeric composition, the polymeric composition further may contain at least one of the following: waxes; pigments; opacifiers; fillers; exfoliated clays; toners; antistatic agents; metals; flame retardants; thermal stabilizers; co-stabilizers; antiozodants; cellulosic materials; impact modifiers; processing aids; lubricating processing aids; internal lubricants; external lubricants; oils; rheology modifiers; powder flow aids; melt-flow aids; dispersing aids; UV stabilizers; plasticizers; fillers; optical modifiers; surface roughness modifiers; surface chemistry modifiers; adhesion modifiers; surface hardeners; compatibilizers; diffusion barrier modifiers; stiffeners; flexibilizers; mold release agents; processing modifiers; blowing agents; thermal insulators; thermal conductors; electronic insulators; electronic conductors; biodegradation agents; antistatic agents; internal release agents; coupling agents; flame retardants; smoke-suppressers; anti-drip agents; or colorants.

In another specific embodiment for preparing a polymeric composition, the amount of the multiple polymeric additive system's liquid component in the polymeric composition in the beginning of the contacting step is in the range of from 0.01 weight percent to less than 60 weight percent, said weight percentage being based on the total weight of the polymeric composition at the beginning of the contacting step. If the weight concentration is not within this range then the advantages of this process are not achieved. More typically, this weight concentration ranges from about 0.02 to 50%. Most typically this weight concentration ranges from about 0.5 to 40%.

In one embodiment for preparing a polymeric composition, the amount of the multiple polymeric additive system's liquid component remaining in the polymeric composition after step (II), wherein at least a portion of the liquid component is removed, is in the range of from more than 0% to 100 weight percent, said weight percent being based on the total liquid component of the multiple polymeric additive system before a portion is removed. Typically, this weight percent is in the range of from about 0.02% to 99.5%, more typically from about 0.5% to 50%, and most typically from about 0.5% to 25%, said weight percent being based on the total liquid component of the multiple polymeric additive system before a portion is removed.

In other specific embodiments for preparing a polymeric composition, after forming the polymeric composition, the polymeric composition may be directly formed into an article, used to form an article, or used further as an additive. In directly forming an article from the polymeric composition, the polymeric composition is typically subjected to additional article forming processes without first isolating the polymeric composition as set forth below. On the other hand, when the polymeric composition is used to form an article, then the polymeric composition is typically first isolated into a form which can be readily used in polymer/plastics processing equipment for forming articles. Examples of forms for ready use, include but are not limited to: liquids, solutions, pastes, wet-cakes, dispersions, emulsions, lattices, powders, pellet, or tablet, and the like.

In another embodiment, the polymeric composition may be further used as an additive. In this case, the multiple polymeric additive system/polymeric component additive may be useful as an additive concentrate. Additive concentrates are typically provided in a solid form, such as a pellet, powder, or tablet, for subsequent processing with polymers and plastics the same as or compatible with the polymeric component. The concentrated form of additives typically provides additives which are easier to handle and disperse in polymeric components than that of the pure additive. Additive concentrates contain at least 1 weight percent of the polymeric component to form the multiple polymeric additive system into said solid form. Typically, additive concentrates contain at least 5 weight percent, more typically at least 10 weight percent, and most typically at least 20 weight percent of the polymeric component, said weight percentage being based on the total weight of the polymeric composition.

Another embodiment of the present invention is forming an article from the polymeric composition of the present invention. Article-forming processes include extrusion, calendering, injection molding, thermoforming, calendering, rotational molding, blow molding, and other processes well know in the plastics processing art. All known plastic parts can be fabricated using these processes and polymeric compositions. Typical uses of the polymeric compositions of the present invention are found in all plastic and polymeric articles that can be made using these processes. Typical examples of such articles include, but are not limited to: packaging materials such as plastic film and sheet; building and construction articles such as PVC siding and profile; automobile and consumer durable articles such as polyolefin body panels and engineering thermoplastic parts; electronics housings and computer parts; thermoplastic elastomers used in sporting equipment; and the like.

What is claimed is:

1. A multiple polymeric additive system comprising:
   a) a liquid component, wherein the liquid component comprises essentially no water and
   b) a solids component, the solids component comprising polymeric additive particles, the polymeric additive particles comprising:
      (i) a first population of polymer particles, and
      (ii) a second population of polymer particles,
   wherein the compositions of the first and second populations of polymer particles are different,
   wherein the solids component is present in an amount of more than 40 weight percent, said weight percent being based on the total weight of the multiple polymeric additive system, and
   wherein the second population of polymeric additive particles has a mean particle diameter of at least about 300 nm.

2. A multiple polymeric additive system as recited in claim 1 wherein the solid component is present in an amount of at least 45 weight percent, said weight percentage being based on the total weight of the multiple polymeric additive system.

3. A multiple polymeric additive system as recited in claim 1 wherein the first population of polymeric additive particles has a mean particle diameter in the range of from 10 nm to 50,000 nm.

4. A process for making a multiple polymeric additive system, the multiple polymeric additive system comprising a liquid component and a solids component, wherein the solids component comprises polymeric additive particles, said process comprising at least the following steps:
   (a) providing an aqueous emulsion polymerization reaction mixture comprising a first population of polymer particles and a second population of polymer particles; and
   (b) polymerizing a first group of one or more ethylenically unsaturated monomers in the aqueous emulsion polymerization reaction mixture,
   wherein after at least a portion of the first group of one or more ethylenically unsaturated monomers is polymerized, the chemical compositions of the first and second populations of polymer particles are different and the second population of polymeric additive particles has a mean particle diameter of at least 300 nm, and
   wherein the solids component is present in an amount which is greater than 40 weight percent, based on the total weight of the multiple polymeric additive system.

5. A process for making a multiple polymeric additive system as recited in claim 4, wherein the weight ratio of the first population of polymer particles to the second population of polymer particles are in the range of from 1:99 to 99:1.

6. A process for making a multiple polymeric additive system as recited in claim 4, further comprising the step of:
   (c) graft-polymerizing a second group of one or more ethylenically unsaturated monomers in the presence of the first and second populations of polymer particles to provide a polymer adjacent to the surfaces of the polymer particles of the first and second populations, wherein the second group of one or more ethylenically unsaturated monomers are the same or different as the first group of one or more ethylenically unsaturated monomers of step (b).

7. A process for making a multiple polymeric additive system as recited in claim 6, wherein the first group of monomers forms a rubbery core polymer and the second group of monomers forms a hard shell polymer.

8. A process for making a multiple polymeric additive system as recited in claim 7, wherein the rubbery core polymer is present in an amount of from 80 to 99 weight percent, said weight percentage being based on the total weight of the rubbery core and hard shell polymers.

* * * * *